United States Patent
Lee et al.

(10) Patent No.: US 12,446,048 B2
(45) Date of Patent: Oct. 14, 2025

(54) METHOD AND APPARATUS FOR MULTI-STAGE DCI FOR UPLINK PRECODING

(71) Applicant: Samsung Electronics Co., Ltd., Suwon-si (KR)

(72) Inventors: Gilwon Lee, McKinney, TX (US); Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 485 days.

(21) Appl. No.: 17/934,520

(22) Filed: Sep. 22, 2022

(65) Prior Publication Data

US 2023/0128411 A1    Apr. 27, 2023

Related U.S. Application Data

(60) Provisional application No. 63/278,786, filed on Nov. 12, 2021, provisional application No. 63/253,648, filed on Oct. 8, 2021.

(51) Int. Cl.
*H04W 72/23*    (2023.01)
*H04B 7/0456*    (2017.01)

(52) U.S. Cl.
CPC .......... *H04W 72/23* (2023.01); *H04B 7/0456* (2013.01)

(58) Field of Classification Search
CPC ............. H04W 72/23; H04W 72/1268; H04W 72/232; H04W 72/0453; H04B 7/0456;
(Continued)

(56) References Cited

U.S. PATENT DOCUMENTS

2020/0053764 A1   2/2020  Kim et al.
2020/0413433 A1*  12/2020 Jiang ............... H04L 1/0072
(Continued)

FOREIGN PATENT DOCUMENTS

WO    2019241929 A1   12/2019
WO    2021000325 A1   1/2021
(Continued)

OTHER PUBLICATIONS

Extended European Search Report issued Oct. 25, 2024 regarding Application No. 22878882.4, 9 pages.
(Continued)

*Primary Examiner* — Charles C Jiang
*Assistant Examiner* — Rachel Elizabeth Marks

(57) ABSTRACT

Apparatuses and methods for multi-stage downlink control information (DCI) for uplink (UL) precoding in a wireless communication system. A method for operating a user equipment (UE) receiving, via a two-stage DCI framework, configuration information for transmission of an UL signal. The configuration information includes allocated resources for the UL signal transmission and UL precoding information. The method further includes applying, based on the UL precoding information, UL precoding for the transmission of the UL signal and transmitting the precoded UL signal on the allocated resources. The two-stage DCI framework includes a first-stage DCI, $X_1$, and a second-stage DCI, $X_2$. The first-stage DCI, $X_1$, includes at least one of first information associated with the second-stage DCI and a first part of the configuration information. The second-stage DCI, $X_2$, includes at least one of second information based on the first information and a second part of the configuration information.

19 Claims, 7 Drawing Sheets

(58) Field of Classification Search
CPC ... H04B 7/0404; H04B 7/0639; H04L 5/0092; H04L 5/0044
See application file for complete search history.

(56) References Cited

U.S. PATENT DOCUMENTS

2021/0126681 A1\* 4/2021 Huang ................. H04W 72/23
2023/0094010 A1\* 3/2023 Zhang ................. H04B 7/0639
370/329

FOREIGN PATENT DOCUMENTS

WO       2021109137 A1    6/2021
WO       WO-2021114215 A1 \* 6/2021

OTHER PUBLICATIONS

Huawei et al., "Codebook based transmission for UL MIMO", 3GPP TSG RAN WG1 NR Ad-Hoc#3, R1-1715584, Sep. 2017, 10 pages.
"3rd Generation Partnership Project; Technical Specification Group Radio Access Network; Evolved Universal Terrestrial Radio Access (E-UTRA); Physical channels and modulation (Release 16)", 3GPP TS 36.211 V16.5.0, Mar. 2021, 249 pages.
"3rd Generation Partnership Project; Technical Specification Group Radio Access Network; Evolved Universal Terrestrial Radio Access (E-UTRA); Multiplexing and channel coding (Release 16)", 3GPP TS 36.212 V16.5.0, Mar. 2021, 255 pages.
"3rd Generation Partnership Project; Technical Specification Group Radio Access Network; Evolved Universal Terrestrial Radio Access (E-UTRA); Physical layer procedures (Release 16)", 3GPP TS 36.213 V16.5.0, Mar. 2021, 577 pages.
"LTE; Evolved Universal Terrestrial Radio Access (E-UTRA); Medium Access Control (MAC) protocol specification (3GPP TS 36.321 version 16.4.0 Release 16)", ETSI TS 136 321 V16.4.0, Apr. 2021, 144 pages.
"LTE; Evolved Universal Terrestrial Radio Access (E-UTRA); Radio Resource Control (RRC); Protocol specification (3GPP TS 36.331 version 16.4.0 Release 16)", ETSI TS 136 331 V16.4.0, Apr. 2021, 1093 pages.
"5G; NR; Physical channels and modulation (3GPP TS 38.211 version 16.5.0, Release 16)", ETSI TS 138 211 V16.5.0, Apr. 2021, 138 pgs.
"5G; NR; Multiplexing and channel coding (3GPP TS 38.212 version 16.5.0 Release 16)", ETSI TS 138 212 V16.5.0, Apr. 2021, 155 pages.
"5G; NR; Physical layer procedures for control (3GPP TS 38.213 version 16.5.0 Release 16)", ETSI TS 138 213 V16.5.0, Apr. 2021, 188 pages.
"5G; NR; Physical layer procedures for data (3GPP TS 38.214 version 16.5.0 Release 16)", ETSI TS 138 214 V16.5.0, Apr. 2021, 173 pages.
"5G; NR; Physical layer measurements (3GPP TS 38.215 version 16.4.0 Release 16)", ETSI TS 138 215 V16.4.0, Jan. 2021, 31 pages.
"5G; NR; Medium Access Control (MAC) protocol specification (3GPP TS 38.321 version 16.4.0 Release 16)", ETSI TS 138 321 V16.4.0, Apr. 2021, 159 pages.
"5G; NR; Radio Resource Control (RRC); Protocol specification (3GPP TS 38.331 version 16.4.1 Release 16)", ETSI TS 138 331 V16.4.1, Apr. 2021, 932 pages.
International Search Report and Written Opinion issued Jan. 20, 2023 regarding International Application No. PCT/KR2022/014985, 9 pages.

\* cited by examiner

METHOD AND APPARATUS FOR MULTI-STAGE DCI FOR UPLINK PRECODING

CROSS-REFERENCE TO RELATED APPLICATIONS AND CLAIM OF PRIORITY

The present application claims priority to U.S. Provisional Patent Application No. 63/253,648, filed on Oct. 8, 2021, and U.S. Provisional Patent Application No. 63/278,786, filed on Nov. 12, 2021. The contents of the above-identified patent documents are incorporated herein by reference.

TECHNICAL FIELD

The present disclosure relates generally to wireless communication systems and, more specifically, the present disclosure relates to a multi-stage downlink control information (DCI) for uplink (UL) precoding in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a multi-stage DCI for UL precoding in a wireless communication system.

In one embodiment, a user equipment (UE) is provided. The UE includes a transceiver configured to receive, via a two-stage DCI framework, configuration information for transmission of an UL signal. The configuration information includes allocated resources for the UL signal transmission and UL precoding information. The UE further includes a processor operably coupled to the transceiver. The processor is configured to, based on the UL precoding information, apply UL precoding for the transmission of the UL signal. The two-stage DCI framework includes a first-stage DCI, $X_1$, and a second-stage DCI, $X_2$. The first-stage DCI, $X_1$, includes at least one of first information associated with the second-stage DCI and a first part of the configuration information. The second-stage DCI, $X_2$, includes at least one of second information based on the first information and a second part of the configuration information. The transceiver is further configured to transmit the precoded UL signal on the allocated resources according to the configuration information.

In another embodiment, a base station (BS) is provided. The BS includes a transceiver configured to transmit, via a two-stage DCI framework, configuration information for transmission of UL signal. The configuration information includes allocated resources for the UL signal transmission and UL precoding information. The transceiver is further configured to receive the UL signal, precoded based on the UL precoding information, on the allocated resources according to the configuration information. The two-stage DCI framework includes a first-stage DCI, $X_1$, and a second-stage DCI, $X_2$. The first-stage DCI, $X_1$, includes at least one of first information associated with the second-stage DCI and a first part of the configuration information. The second-stage DCI, $X_2$, includes at least one of second information based on the first information and a second part of the configuration information.

In yet another embodiment, a method for operating a UE is provided. The method includes receiving, via a two-stage DCI framework, configuration information for transmission of UL signal. The configuration information includes allocated resources for the UL signal transmission and UL precoding information. The method further includes applying, based on the UL precoding information, UL precoding for the transmission of the UL signal and transmitting the precoded UL signal on the allocated resources according to the configuration information. The two-stage DCI framework includes a first-stage DCI, $X_1$, and a second-stage DCI, $X_2$. The first-stage DCI, $X_1$, includes at least one of first information associated with the second-stage DCI and a first part of the configuration information. The second-stage DCI, $X_2$, includes at least one of second information based on the first information and a second part of the configuration information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
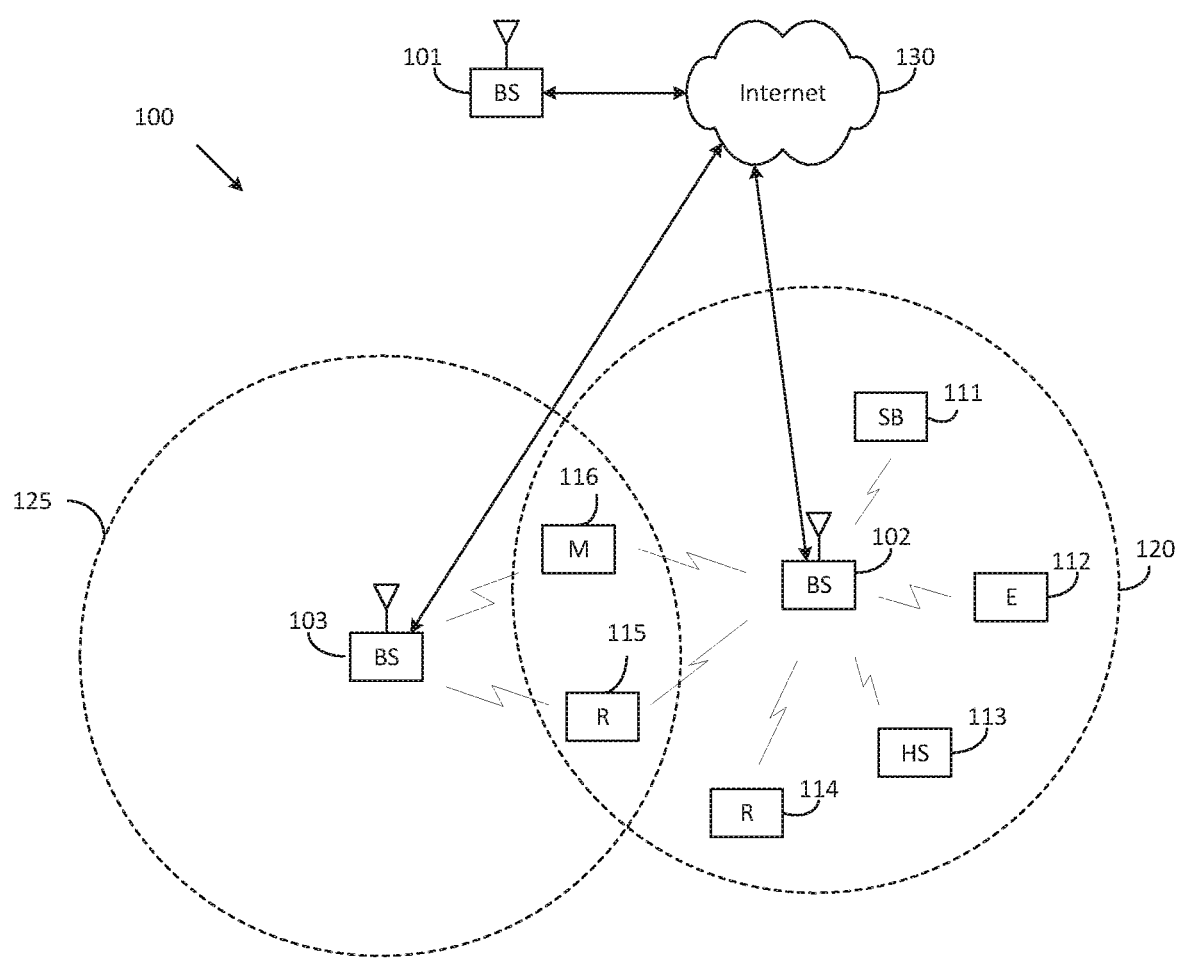
FIG. 1 illustrates an example of wireless network according to embodiments of the present disclosure.

FIG. 1 through FIG. 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v16.5.0, "E-UTRA, Physical channels and modulation"; 3GPP TS 36.212 v16.5.0, "E-UTRA, Multiplexing and Channel coding"; 3GPP TS 36.213 v16.5.0, "E-UTRA, Physical Layer Procedures"; 3GPP TS 36.321 v16.4.0, "E-UTRA, Medium Access Control (MAC) protocol specification"; 3GPP TS 36.331 v16.4.0, "E-UTRA, Radio Resource Control (RRC) Protocol Specification"; 3GPP TS 38.211 v16.5.0, "NR, Physical channels and modulation"; 3GPP TS 38.212 v16.5.0, "NR, Multiplexing and Channel coding"; 3GPP TS 38.213 v16.5.0, "NR, Physical Layer Procedures for Control"; 3GPP TS 38.214 v16.5.0, "NR, Physical Layer Procedures for Data"; 3GPP TS 38.215 v16.4.0, "NR, Physical Layer Measurements"; 3GPP TS 38.321 v16.4.0, "NR, Medium Access Control (MAC) protocol specification"; and 3GPP TS 38.331 v16.4.1, "NR, Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
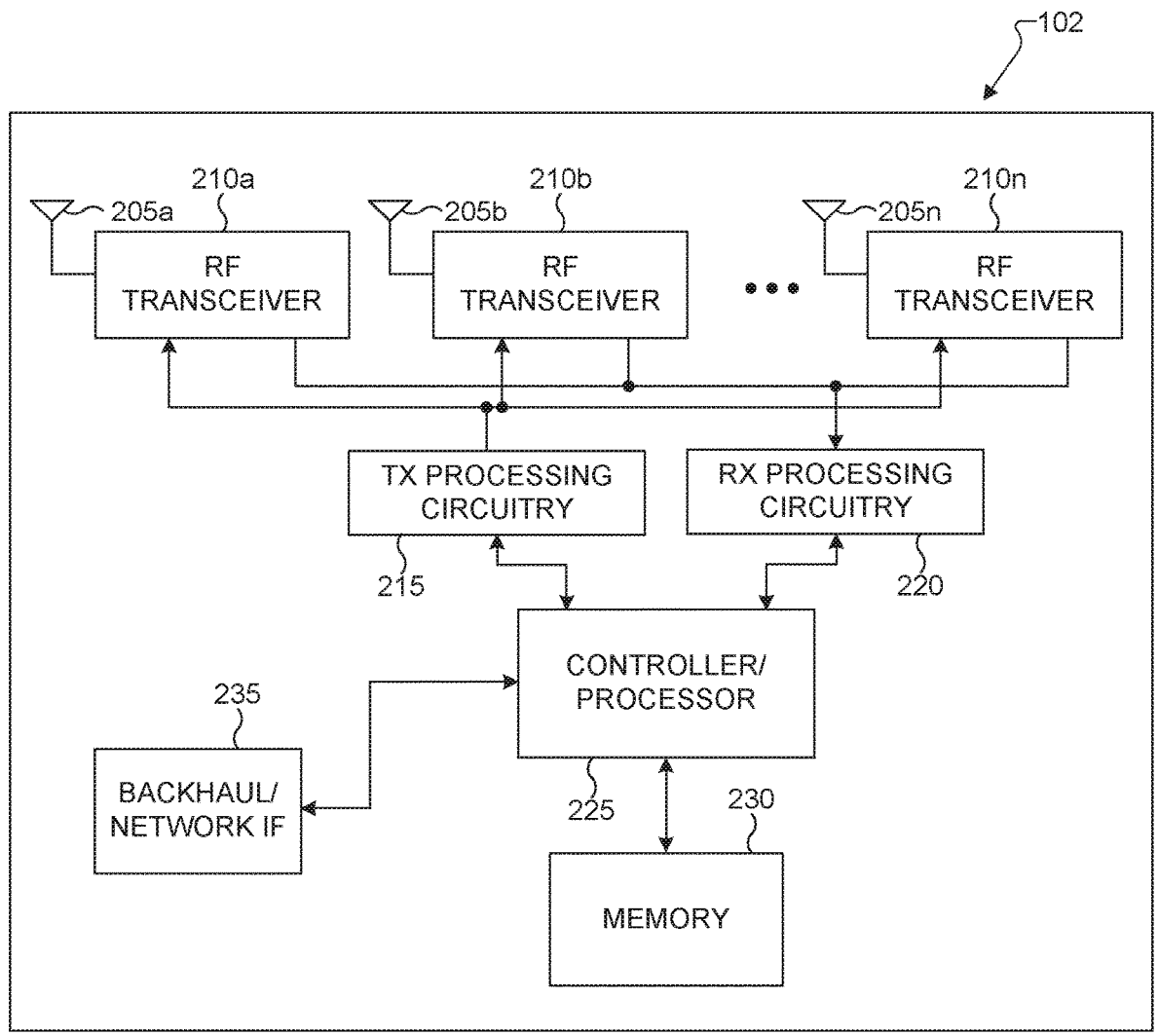
FIG. 2 illustrates an example of gNB according to embodiments of the present disclosure.
Figure 3:
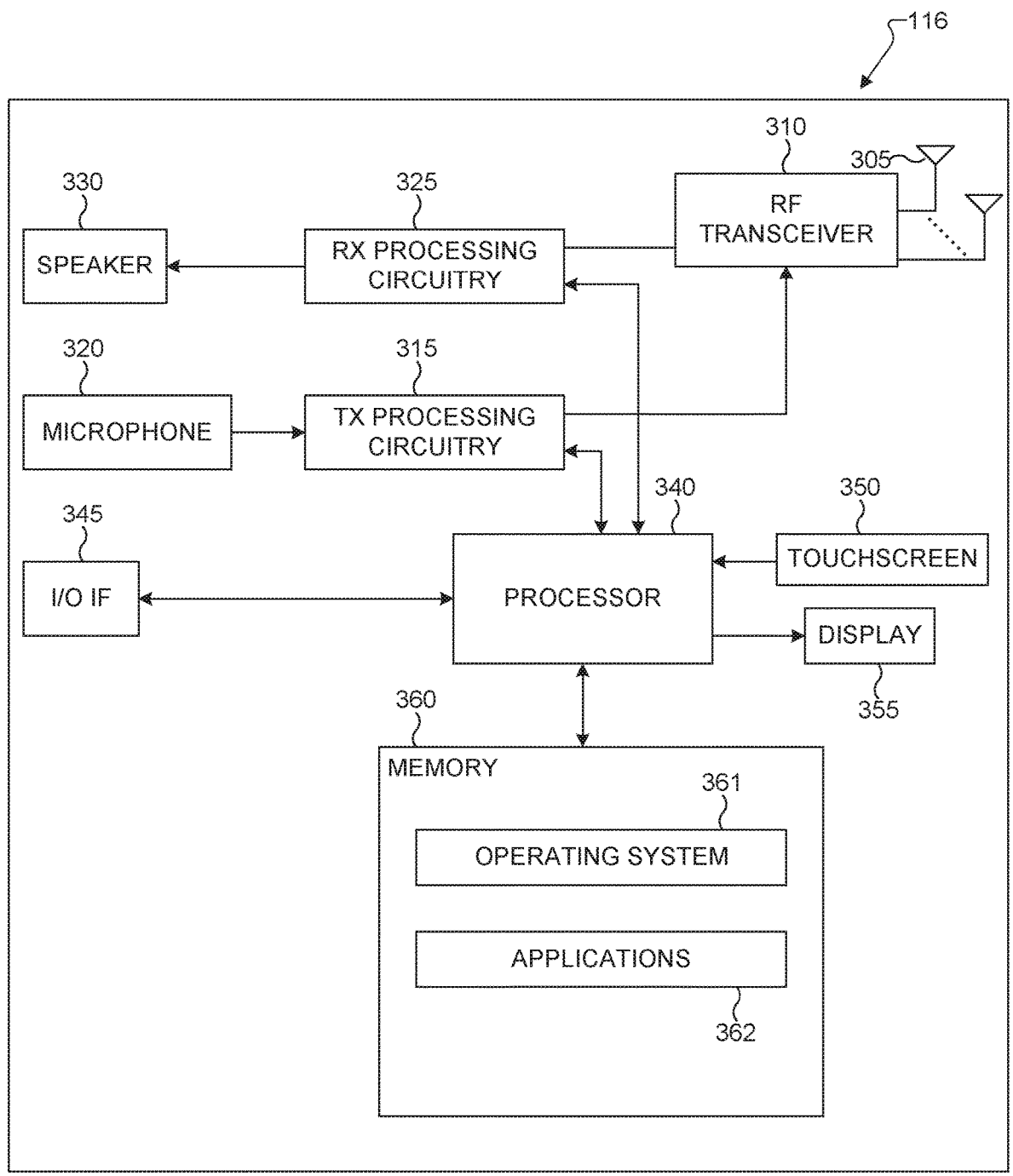
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a multi-stage DCI for UL precoding in a wireless communication system. In certain embodiments, and one or more of the gNBs 101-103 includes circuitry, programing, or a combination thereof, for a multi-stage DCI for UL precoding in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support a multi-stage DCI for UL precoding in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a multi-stage DCI for UL precoding in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
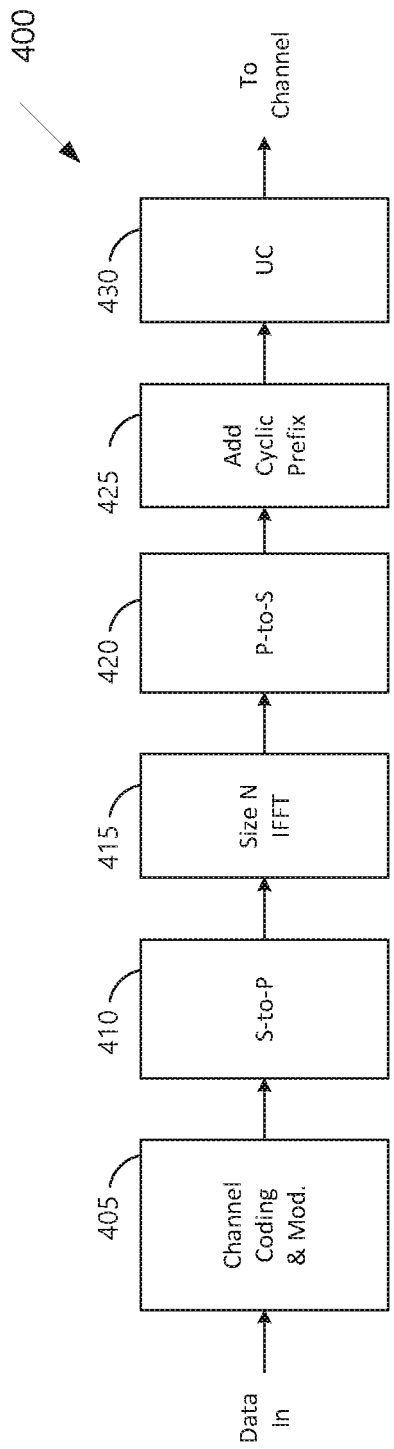
FIGS. 4 and 5 illustrate example of wireless transmit and receive paths according to this disclosure.
Figure 5:
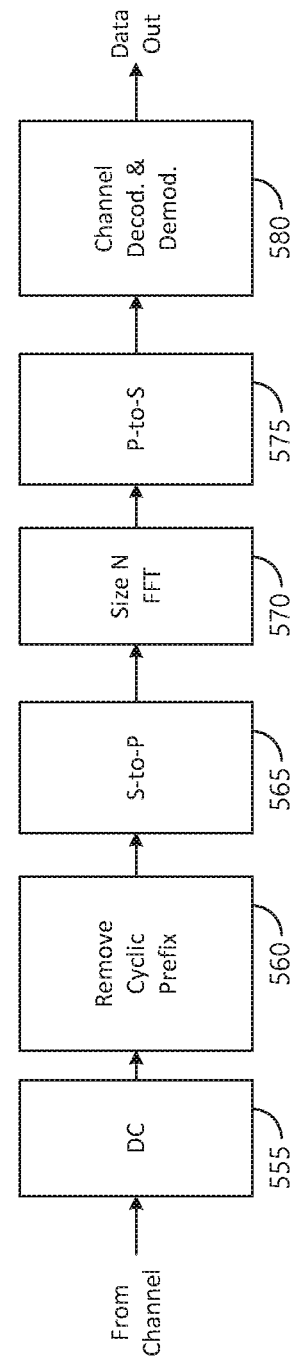

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a downconverter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the UL from UEs 111-116. Similarly, each of UEs 111-116 may implement the transmit path 400 for transmitting in the UL to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of UL channels from the UE.

Figure 6A:
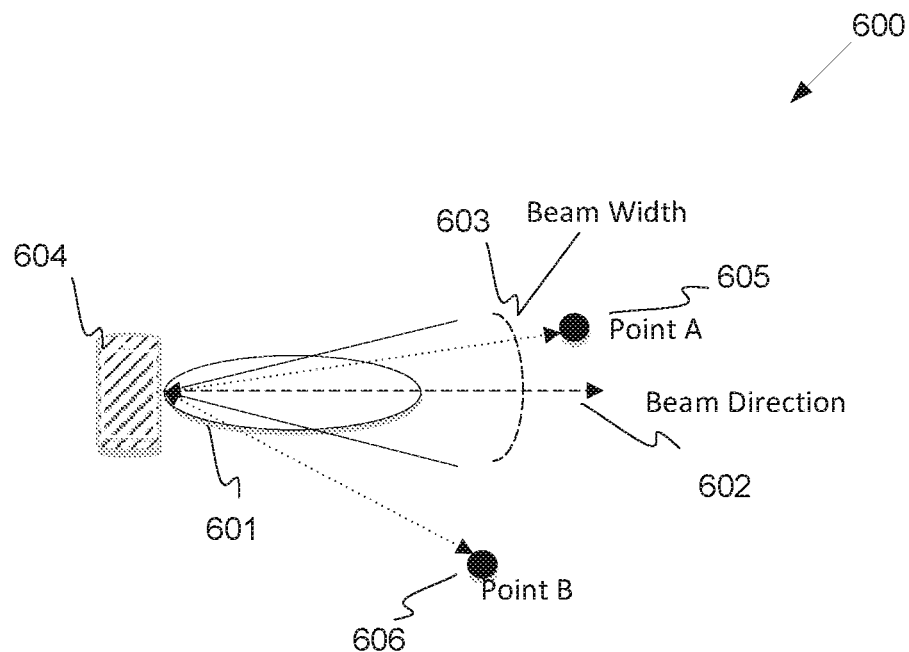
FIG. 6A illustrates an example of wireless system beam according to embodiments of the present disclosure.

FIG. 6A illustrates an example of wireless system beams 600 according to embodiments of the present disclosure. An embodiment of the wireless system beams 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
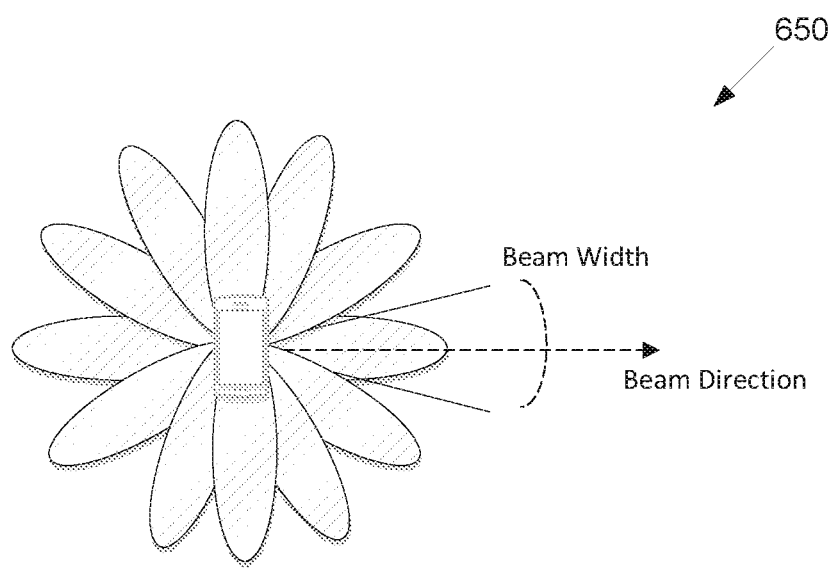
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
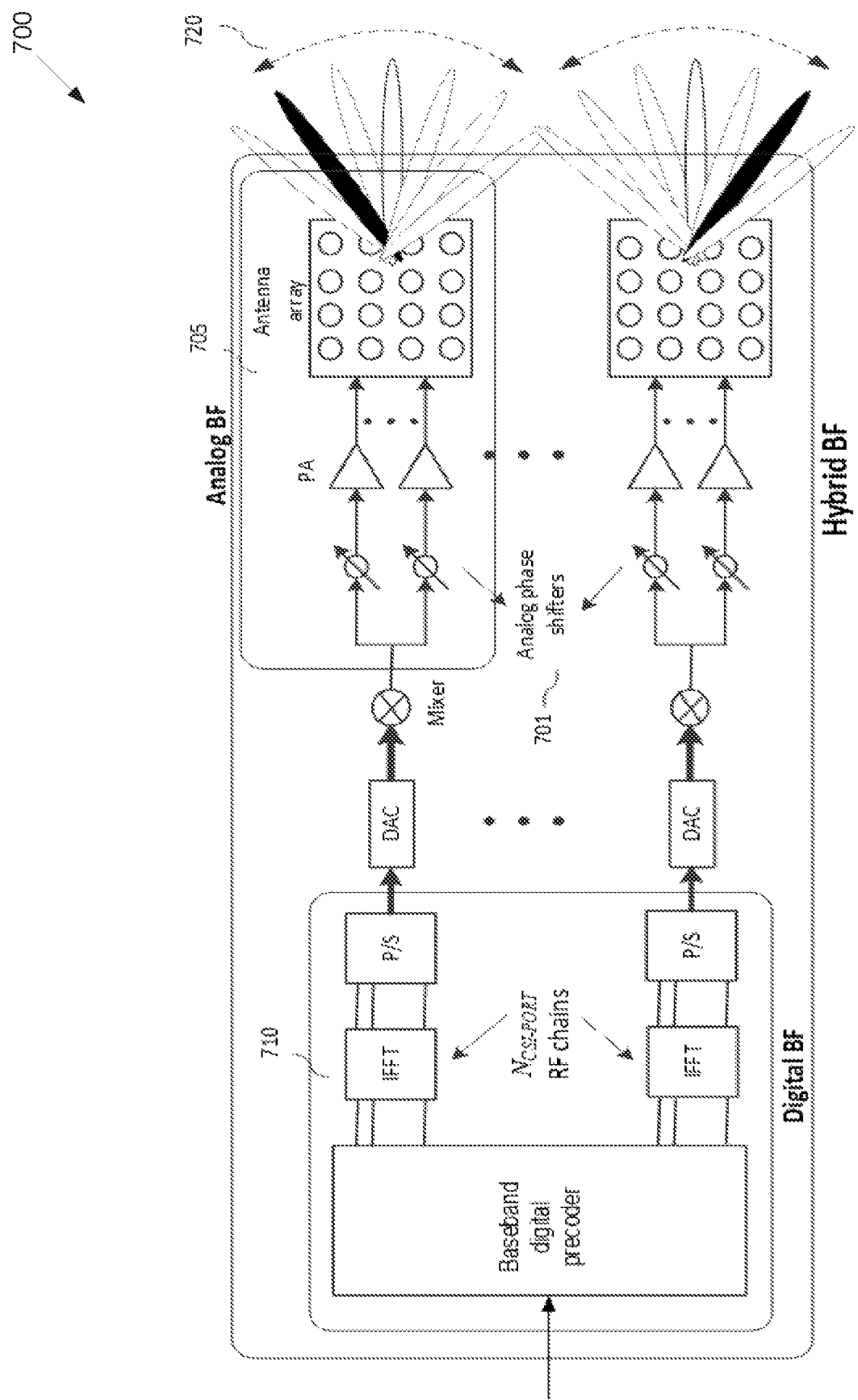
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @ 100 m distance), larger number of and sharper analog beams (hence larger number of radiators in the array) may be needed to compensate for the additional path loss.

Boosting UL capacity becomes more important as various use cases that require transmitting high quality of sensor information at devices are coming in the near future as typical applications, such as industrial IoT applications including smart factory, mining, airport, autonomous devices exchanging sensor information, and other advanced devices supporting Augmented reality and virtual reality (AR/VR).

Currently, several aspects on UL MIMO enhancement such as frequency-selective UL precoding to boost UL capacity have been considered as key candidate items of MIMO for the upcoming release (Rel-18). Those items are well defined based on frequency-selective UL precoding have been developed under frameworks similar to the components of DL precoding, wherein significant indication overhead (e.g., PDCCH overhead) can be required.

In order to support frequency-selective UL precoding which requires significant indication/configuration overhead, this disclosure explores two-stage DCI framework wherein the first-stage DCI contains part of information on frequency-selective UL precoding and/or information on second-stage DCI, and the second stage can contain the remaining information of frequency-selective UL precoding.

In the present disclosure, embodiments relate to electronic devices and methods on frequency-selective UL precoding for codebook-based UL operations, more particularly, to electronic devices and methods on frequency-selective UL precoding via two-stage DCI framework for codebook-based UL operations in wireless networks.

In NR, it has been supported that a TPMI can be indicated to a UE to apply the UL precoding corresponding to the indicated TPMI for all scheduled RBs (i.e., WB) for UL transmission. Rel-18 UL MIMO may be likely to consider frequency-selective UL precoding to enhance UL performance up to the performance comparable to 5G NR DL MIMO. Thus, a framework to support frequency-selective UL precoding (which potentially imposes significant indication overhead in DL control signal) needs to be developed.

The present disclosure provides a two-stage DCI framework to support frequency-selective UL precoding based on 1) dual-stage codebook and 2) multiple TPMI indications.

The present disclosure provides a two-stage DCI framework to support high-resolution UL precoding based on 1) high-resolution dual-stage codebook and 2) high-resolution triple-stage codebook.

The frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band." Alternatively, the CSI reporting band can include only a collection of subbands within the DL system bandwidth. This can also be termed "partial band."

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may require multiple CSI reporting bands. The value of n can either be configured semi-statically (via higher layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

In NR, there are three types of UL resource allocation schemes, namely Type-0, Type-1, and Type-2. In UL resource allocation of Type 0, the resource block assignment information includes a bitmap indicating the resource block groups (RBGs) that are allocated to the scheduled UE where a RBG is a set of consecutive resource blocks defined by higher layer parameter rbg-Size configured in pusch-Config and the size of the bandwidth part as defined in TABLE 1.

TABLE 1

| Bandwidth Part Size | Nominal RBG size P | |
|---|---|---|
| | Configuration 1 | Configuration 2 |
| 1-36 | 2 | 4 |
| 37-72 | 4 | 8 |
| 73-144 | 8 | 16 |
| 145-275 | 16 | 16 |

In UL resource allocation of type 1, the resource block assignment information indicates to a scheduled UE a set of contiguously allocated non-interleaved resource blocks within the active bandwidth part of size $N_{BWP}^{size}$ PRB s except for the case when DCI format 0_0 is decoded in any common search space in which case the size of the initial UL bandwidth part $N_{BWP,0}^{size}$ may be used.

An UL type 1 resource allocation field includes a resource indication value (RIV) corresponding to a starting virtual resource block ($RB_{start}$) and a length in terms of contiguously allocated resource blocks $L_{RBs}$.

For UL type 2 resource allocation, please refer to 3GPP standard specification.

In NR, it has been supported that a TPMI is indicated to a UE through DCI or high layer signaling to perform UL transmission and the UL precoding corresponding to the indicated TPMI is applied for the whole scheduled/allocated RBs when performing the corresponding UL transmission.

Rel-18 UL MIMO may be likely to consider frequency-selective UL precoding to enhance UL performance, especially for CP-OFDM UL transmission. Thus, a framework to support frequency-selective UL precoding (which potentially imposes significant indication overhead in DL control signal) needs to be developed.

The present disclosure provides a two-stage DCI framework to support frequency-selective UL precoding based on 1) dual-stage codebook and 2) multiple TPMI indications.

The present disclosure provides a two-stage DCI framework to support high-resolution UL precoding based on 1) high-resolution dual-stage codebook and 2) high-resolution triple-stage codebook.

A two-stage DCI framework (namely two-stage sidelink control information (SCI)) has been adopted in 5G NR Sidelink. In the two-stage SCI framework, the first-stage SCI contains information to receive the second-stage SCI such as time/frequency resource assignments and MCS, and the second-stage SCI contains information such as HARQ, source ID, destination ID, etc. Embodiments/examples described in this disclosure can comprise of the component/ philosophy of two-stage SCI framework in addition to the provided components (of this disclosure) relevant to UL precoding.

In the present disclosure, a two-stage DCI framework is provided but the two-stage DCI framework can be extended to the case of a single-stage DCI framework by treating all information contained in the first- and second-stage DCI as to be contained in the single-stage DCI. Also, the following embodiments/examples can cover all straightforward extensions to the cases of multi-stage DCI framework (i.e., more than two-stage).

A two-stage DCI framework (namely two-stage sidelink control information (SCI)) has been adopted in 5G NR Sidelink. In the two-stage SCI framework, the first-stage SCI contains information to receive the second-stage SCI such as time/frequency resource assignments and MCS, and the second-stage SCI contains information such as HARQ, source ID, destination ID, etc. Embodiments/examples described in the present disclosure can comprise of the component/philosophy of two-stage SCI framework in addition to the provided components (of this disclosure) relevant to UL precoding.

In one embodiment, a UE is indicated/configured to apply (frequency-selective) UL precoding via a two-stage DCI framework, wherein the first-stage DCI contains information $X_1$ and the second-stage DCI contains information $X_2$ for precoded UL transmission.

In one example, information $X_1$ in the first-stage DCI contains resource allocation information (e.g., allocated RBs or RBGs) for UL transmission, the number of SBs (K) (or the SB size), the number of UL precoding layers (RI) (unless RI is fixed), SRI (if the UE is configured with multiple SRS resources), CQI (or MCS for UL transmission), and/or WB TPMI (or WB codebook component), and information $X_2$ in the second-stage DCI contains SB TPMI (or SB codebook component).

In one example, any combination (or a subset) of the information elements described above is contained in information $X_1$ in the first-stage DCI and any combination of the remaining information elements is contained in information $X_2$ in the second-stage DCI.

In one example, information $X_1$ in the first-stage DCI contains resource allocation information for UL transmission, the number of SB s, the number of UL precoding layers, and WB TPMI, and information $X_2$ in the second-stage DCI contains SB TPMI.

In one example, information $X_1$ in the first-stage DCI contains resource allocation information for UL transmission, and information $X_2$ in the second-stage DCI contains the number of SBs, the number of UL precoding layers, WB TPMI, and SB TPMI.

For the number of SBs (K), it can be fixed or varied. There can be several examples for the case that the number of SBs is fixed: (1) in one example, K is fixed to 2; and (2) in another example, K is fixed to a number greater than 2.

There can be several examples for the case that the number of SBs is varied as shown examples below.

In one example, K is associated with the number of allocated RBs or RBGs for UL transmission: (1) for example, K can be defined as the same number of allocated RBs or RBGs. In this case, the size of SB is the same as RB or RBGs; and (2) for example, when a SB size ($n_{SB}$) is given, the number of SBs K can be defined as $$\left\lceil \frac{B}{n_{SB}} \right\rceil,$$

where B is the number of allocated RBs.

In one example, K is configured by NW and selected from a set $S_K$, e.g., $S_K=\{5, 10\}$, $\{2, 4, 6, 8\}$, $\{1, 2, 3, 4\}$ etc.

In one example, K is configured according to the same mechanism as for the DL (as described in 3GPP standard specification TS 38.214) depending on the SB size and the resource allocation (number of PRBs allocated for the UL transmission) where the SB size can be fixed (e.g., 2 or 4) or configured (via higher layer, or DCI).

For SB size $n_{SB}$, it can be fixed or varied. There can be several examples for the case that the SB size is fixed: (1) in one example, $n_{SB}$ is fixed to 1 or 2 or 4 or depends on the number of PRBs allocated for UL transmission; and (2) in another example, $n_{SB}$ is fixed to a number greater than 1, e.g., 2 or 4 or depends on the number of PRBs allocated for UL transmission.

There can be several examples for the case that the SB size $n_{SB}$ is varied as shown in examples below.

In one example, $n_{SB}$ is associated with the number of allocated RBs or RBGs for UL transmission: (1) for example, $n_{SB}$ can be defined as the same size of RB or RBG depending on the configured UL resource allocation type (Type-0/1); and (2) for example, when the number of SBs (K) is given, the SB size $n_{SB}$ can be defined as follows: if K divides B, then the SB size is $$\frac{B}{K},$$

otherwise the SB size is $$\left\lfloor \frac{B}{K} \right\rfloor$$

for K−1 SBs and the number of the remaining SBs for the last SB, where B is the number of allocated RBs and r is the remainder of $$\frac{B}{K}.$$

In one example, $n_{SB}$ is configured by NW and selected from a set $S_{n_{SB}}$, e.g., $S_{n_{SB}}=\{2, 4\}$, $\{4, 8\}$, $\{8, 16\}$, etc.

In one example, the UE is configured with the frequency-selective (FS) UL precoding or frequency-non-selective (i.e., wideband) UL precoding depending on the size of allocated PRBs (B) for UL transmission. For example, when B≤b, the UL transmission is based on a frequency-non-selective (i.e., wideband) UL precoding, and when B>b, the UL transmission is based on a FS UL precoding, where b can be a fixed threshold (e.g., 12 or 24 PRBs) or is configured (e.g., via higher layer), and may also depend on UE capability.

Note that the above examples can also be applicable to any embodiment/example that will be described below.

In one embodiment 1, the UL codebook is based on a dual-stage codebook $W=W_1W_2$, where $W_1$ is for the WB component of the codebook which includes beam/pre-coder groups, and $W_2$ is for the subband (SB) component of the codebook which includes beam/pre-coder (selected from the beam/precoder group) and co-phase selection (e.g., for dual-polarized antenna structure).

One example of dual-stage codebook for the UL codebook is DL Type-I CSI codebook as described in 3GPP standard specification. For example, L (1D or 2D) DFT beam vectors are selected to construct the WB component $W_1$. For example, L can be 1 or 4. In one example, for each SB, co-phase and beam/pre-coder selection component $W_2$ can be constructed according to (or similar to) DL Type-I CSI codebook as described in 3GPP standard specification.

Let $i_1$ and $i_2$ be codebook indices for WB component codebook $W_1$ and SB component codebook $W_2$, respectively.

For example, codebook index $i_1$ for the WB component codebook can be further decomposed into multiple indices $i_{1,1}$, $i_{1,2}$, and $i_{1,3}$, similar to DL Type-I CSI codebook. For example, $i_{1,1}$ and $i_{1,2}$ are codebook indices for indicating a DFT beam or group comprising L DFT vectors. For example, $i_{1,3}$ is a codebook index for indicating an orthogonal DFT beam (or beam group) to the DFT beam (or beam group) indicated by $i_{1,1}$ and $i_{1,2}$.

In one example, $i_2 \in \{0, 1\}$, $i_2 \in \{0, 1, 2, 3\}$, $i_2 \in \{0, 1, 2, \ldots, 7\}$ or $i_2 \in \{0, 1, 2, \ldots, 15\}$.

In one embodiment, information $X_1$ in the first-stage DCI contains codebook index $i_1$ for WB component codebook $W_1$ and information $X_2$ in the second-stage DCI contains codebook index $i_2$ for SB component codebook $W_2$.

In one example, the number of SBs is indicated/configured or can implicitly be computed, e.g., using the information on allocated RBs and a given SB size, in the first-stage DCI (or RRC, MAC-CE), and codebook index $i_2$ for SB component codebook $W_2$ is indicated per SB in the second-stage DCI. That is, the size of second-stage DCI can be determined based on the number of SBs that can be known in the first-stage DCI (or beforehand for the case that it is pre-determined or configured via higher-layer signaling), since codebook index $i_2$ is indicated for each of the SBs.

In one embodiment, information $X_2$ in the second-stage DCI contains both codebook index $i_1$ for WB component codebook $W_1$ and codebook index $i_2$ for SB component codebook $W_2$.

In one example, information $X_1$ in the first-stage DCI contains information relevant to indicating UL codebook such as the number of precoding layers, the number of SBs, and resource allocation information, and thus the second-stage DCI contains only codebook index $i_1$ for WB component codebook $W_1$ and codebook index $i_2$ for SB component codebook $W_2$. In this case, the size of second-stage DCI can be determined based on the information indicated in the first-stage DCI.

In another example, information $X_1$ in the first-stage DCI does not contain any information relevant to UL codebook (e.g., $X_1$ contains information on allocated RBs but not on UL codebook), and all information relevant to the UL codebook is contained in $X_2$ in the second-stage DCI. For example, the number of precoding layers (RI), the number of SBs, CQI, $i_1$ and $i_2$ are the information relevant to the UL codebook. In this case, the size of second-stage DCI may not be known to the UE before the DCI is decoded, so blind decoding may be needed.

In one embodiment, information $X_1$ in the first-stage DCI contains the codebook index $i_1$ for WB component codebook $W_1$ and information $X_2$ in the second-stage DCI contains information on a precoder cycling pattern for UL precoding in the allocated RBs. A precoder cycling pattern is to determine how each beam of the selected beams indicated by $i_1$ is used/applied in a pattern for the allocated RBs. For example, each beam of the selected beams is applied for each SB in turn in the cycling manner.

In one example, a precoder cycling pattern is pre-determined or fixed. In this case, $i_2$ or/and the second-stage DCI may not be needed.

In one example, a parameter to enable cycling precoding is configured by NW via RRC, MAC-CE, DCI, or first-stage DCI signaling. This parameter can be a 1-bit indicator.

In one example, a precoder cycling pattern is configured by NW via the second-stage DCI signaling. In one example, a parameter to indicate one of the cycling patterns is contained in the second-stage DCI. For example, a $\log_2 L!$-bit indicator is used to indicate one of all permutations using L beams to be applied for each SB in the cycling manner.

In one embodiment, information $X_2$ in the second-stage DCI contains both codebook index $i_1$ for WB component codebook $W_1$ and information on a precoder cycling pattern for allocated RBs.

In one example, a parameter to enable cycling precoding is configured by NW via RRC, MAC-CE, DCI, or first- or second-stage DCI signaling. This parameter can be a 1-bit indicator.

In one example, a precoder cycling pattern is configured by NW via the second-stage DCI signaling. In one example, a parameter to indicate one of the cycling patterns is contained in the second-stage DCI. For example, a $\log_2 L!$-bit indicator is used to indicate one of all permutations using L beams to be applied for each SB in the cycling manner.

In one embodiment 1.XX, information $X_1$ in the first-stage DCI contains the codebook index $i_1$ for WB component codebook $W_1$ and a first subset of the codebook index $i_2$ for SB component codebook $W_2$, and information $X_2$ in the second-stage DCI contains a second subset of the codebook index $i_2$ for SB component codebook $W_2$, where the first and second subsets are determined/configured according to at least one of the following examples.

In one example, the first subset includes $i_2$ for one SB, and the second subset includes $i_2$ for remaining SBs.

In one example, the first subset includes $i_2$ for $N_{SB,1}$ SBs, and the second subset includes $i_2$ for remaining $N_{SB,2} = N_{SB} - N_{SB,1}$ SBs. In such examples: (1) $N_{SB,1}$ and $N_{SB,2}$ are fixed; (2) $N_{SB,1}$ and $N_{SB,2}$ are configured; (3) $N_{SB,1}$ is fixed and $N_{SB,2}$ is configured; (4) $N_{SB,2}$ is fixed and $N_{SB,1}$ is configured; (5) $N_{SB,1}$ is configured and $N_{SB,2}$ is determined implicitly; and/or (6) $N_{SB,2}$ is configured and $N_{SB,1}$ is determined implicitly.

In one embodiment 1.YY, information $X_1$ in the first-stage DCI contains the codebook index $i_1$ for WB component codebook $W_1$ and information (I) about the codebook index $i_2$ for SB component codebook $W_2$, and information $X_2$ in the second-stage DCI contains the codebook index $i_2$ for SB component codebook $W_2$ (which is based on the information I included in the first-stage).

In one example, information I comprises of parameter "SBDifferentialIndicationEnabledForI2" (which is explained herein) to enable or disable $i_2$ indication in a SB differential manner. If this parameter is indicated to "disable," $i_2$ is indicated in an original manner (i.e., indicated for each SB) in the second stage DCI. If this parameter is indicated to "enable," $i_2$ is indicated in a SB differential manner.

In one example, information I comprises of a parameter to indicate the presence of a bit-map indicator for $i_2$ SB differential indication.

In one example, information I comprises of a parameter to indicate the presence of indicator $H_1$ and/or indicator $H_2$ ($H_1$ and $H_2$ are explained in herein) for $i_2$ SB differential indication.

In one example, information I comprises of codebook subset restriction for UL precoder selection such as codebook index $i_1$, $i_2$, RI (which is described herein).

In one embodiment, codebook index $i_2$ for the SB component codebook $W_2$ is defined in a SB differential manner, where codebook index $i_2$ for a SB is determined based on codebook index $i_2$ for the previous SB. The SB differential indication mode can be "on" or "off" using a parameter, (for example, it may be referred as "SBDifferentialIndication-EnabledForI2"), via high-layer signaling, MAC-CE or DCI.

In one example, codebook index $i_2$ for a SB is indicated only when the value is different from codebook index $i_2$ for the previous SB.

In one example, a bit-map indicator with K−1 bits (or K bits if naively defined) is used to indicate which SB has the same codebook index $i_2$ as the one in the previous SB. In this case, the codebook index $i_2$ for the first SB may be indicated and then based on it, the bit-map indicator with K−1 bits is used to indicate which SB becomes different from the previous SB. In one example, "0" indicates that the corresponding SB has the same codebook index $i_2$ as the one in the previous SB, whereas "1" indicates that the corresponding SB has a different codebook index $i_2$ from the one in the previous SB. Thus, in this case, it is enough to indicate $i_2$ for the SBs corresponding to "1s" indicated in the bit-map indicator.

For example, for a rank-1 case, $W_1$ comprises of L=4 DFT beam vectors, which are indicated by $i_1$, and $i_2 \in \{0, 1, 2, \ldots, 15\}$ is used to select one of the beam vectors of $W_1$ and one of the cross-pol phases for each SB, i.e., a four-bit is needed for each SB to represent $i_2$. Thus, in this case, 4×K bits are needed for all SBs. On the other hands, if the differential scheme is used, the total required number of bits is K−1+4(D+1), where D is the number of "1s" (where the $i_2$ values change) indicated in the bit-map indicator. Thus, in this example, if $$D \leq \frac{3K-3}{4},$$

the total required number of bits becomes less than or equal to 4×K. In one example, the NW can decide "SBDifferentialIndicationEnabledForI2" to be "on" if $$D < \frac{3K-3}{4},$$

to be "off" otherwise. In another example, whether the bit-map indicator is present or not can be indicated using another parameter. As an example, if D is too large (e.g., $$D > \frac{3K-3}{4}$$

in this example), using the-bit map indicator is not efficient in terms of payload size, i.e., 4×K bits indication is more efficient without using the-bit map indicator.

In one example, the bit-map indicator for the SB differential scheme is indicated via the first-stage DCI (i.e., contained in $X_1$), and the $i_2$ values for the SBs corresponding to "1s" indicated in the bit-map indicator are indicated via the second-stage DCI (i.e., contained in $X_2$). In this example, "SBDifferentialIndicationEnabledForI2" can be signaled via either RRC, MAC-CE, or DCI, (e.g., the first-stage DCI). A parameter to indicate whether the bit-map indicator is present or absent can be signaled via either RRC, MAC-CE, DCI, or the first-stage DCI.

In one example, the bit-map indicator for the SB differential scheme and the $i_2$ values for the SBs corresponding to "1s" indicated in the bit-map indicator are indicated via the second-stage DCI (i.e., contained in $X_2$). In this example, "SBDifferentialIndicationEnabledForI2" can be also signaled via either RRC, MAC-CE, or DCI, (e.g., the first-stage DCI or second-stage DCI). A parameter to indicate whether the bit-map indicator is present or absent can be signaled via either RRC, MAC-CE, DCI, the first-stage DCI or the second-stage DCI.

In one example, an indicator $H_1$ is used to indicate SB indices (locations) where the $i_2$ values change from the respective previous SBs among the K SBs and an indicator $H_2$ is used to indicate the number of the corresponding SBs $D(\leq K_{th})$, where $K_{th} \leq K$ is the maximum number of SBs where the $i_2$ values change. In this case, the amount of required bits for indicator $H_1$ is $$\left\lceil \log_2 \binom{K-1}{D} \right\rceil \text{ bits,}$$

and the amount of required bits for indicator $H_2$ is $\lceil \log_2 K_{th} \rceil$ bits. In one example, $$K_{th} = \left\lceil \frac{K}{3} \right\rceil \text{ or } \left\lceil \frac{K}{4} \right\rceil.$$

In one example, the ratio of $$\frac{K_{th}}{K}$$

is fixed or pre-determined. In another example, the ratio of $$\frac{K_{th}}{K}$$

can be configured via RRC, MAC-CE, or DCI signaling. In this example, the codebook indices "$i_2$"s for the D SBs corresponding to the indicated SBs in $H_1$ and the codebook index $i_2$ for the first SB are indicated.

In one example, indicators $H_1$ and $H_2$ are signaled via the first-stage DCI (i.e., contained in $X_1$) and the codebook index $i_2$ for the SB component $W_2$ is signaled via the second-stage DCI (i.e., contained in $X_2$).

In one example, indicator $H_2$ is signaled via the first stage DCI (i.e., contained in $X_1$) and indicator $H_1$ and the codebook index $i_2$ for the SB component $W_2$ are signaled via the second-stage DCI (i.e., contained in $X_2$).

In one example, indicator $H_1$ is signaled via the first stage DCI (i.e., contained in $X_1$) and indicator $H_2$ and the codebook index $i_2$ for the SB component $W_2$ are signaled via the second-stage DCI (i.e., contained in $X_2$).

In one example, indicators $H_1$ and $H_2$ and the codebook index $i_2$ for the SB component $W_2$ are signaled via the second-stage DCI (i.e., contained in $X_2$).

In one example, "SBDifferentialIndicationEnabledForI2" can be also signaled via either RRC, MAC-CE, or DCI, (e.g., the first-stage DCI or the second-stage DCI). In another example, a parameter to indicate whether indicator $H_1$ and/or $H_2$ is/are present or absent can be signaled via either RRC, MAC-CE, DCI, the first-stage DCI or the second-stage DCI.

In one embodiment, the UL codebook is based on multiple $W=W_1W_2$ components for, e.g., a UE having "partial-coherence" capability across the UE's antenna ports or a UE having multiple antenna panels. Note that "partial-coherence" capability across antenna ports means that there are several port groups (or antenna panels) wherein antenna ports within a group can transmit coherently but antenna ports associated different groups may not transmit coherently (depending on their locations on the UE device).

In one embodiment, codebook indices $i_1$ and $i_2$ are independently selected for different coherent groups. In one example, codebook indices $i_1$ for coherent groups are contained in the first-stage DCI and codebook indices $i_2$ for coherent groups are contained in the second-stage DCI. In one example, codebook indices $i_1$ and $i_2$ for coherent groups are contained in the second-stage DCI.

In one embodiment, codebook index $i_1$ is commonly selected for different coherent groups and codebook index $i_2$ is independently selected for different coherent groups. In one example, codebook index $i_1$ commonly selected for different groups is contained in the first-stage DCI and codebook indices $i_2$ for coherent groups are contained in the second-stage DCI. In one example, codebook index $i_1$ commonly selected for different groups and codebook indices $i_2$ for coherent groups are contained in the second-stage DCI.

In one embodiment, codebook index $i_1$ is independently selected for different coherent groups and codebook index $i_2$ is commonly selected for different coherent groups. In one example, codebook indices $i_1$ for coherent groups are contained in the first-stage DCI and codebook index $i_2$ commonly selected for different coherent groups is contained in the second-stage DCI. In one example, codebook index $i_1$ commonly selected for different groups and codebook indices $i_2$ for coherent groups are contained in the second-stage DCI.

In one embodiment, DL multi-panel codebook is used as UL codebook, where each panel corresponds to an antenna group. In one example, a UL codebook based on DL multi-panel codebook has two components, WB component $i_1$ and SB component $i_2$ [Section 5.2.2.2.2 of TS 38.214]: $i_1$ is further decomposed into $i_{1,1}, i_{1,2}, i_{1,3}, i_{1,4}$ or $i_{1,1}, i_{1,2}, i_{1,4}$ depending on rank; $i_{1,4}$ can be further decomposed into $i_{1,4,1}$ or $i_{1,4,1}, i_{1,4,2}$ or $i_{1,4,1}, i_{1,4,2}, i_{1,4,3}$, and $i_2$ can be decomposed into $i_{2,0}, i_{2,1}, i_{2,2}$.

In one example, codebook index $i_1$ for WB component is contained in the first-stage DCI, and codebook index $i_2$ for SB component is contained in the second-stage DCI. In one example, codebook index $i_1$ for WB component and a first subset of $i_2$ for SB component are contained in the first-stage DCI, and a second set of $i_2$ for SB component is contained in the second-stage DCI. In one example, codebook index $i_1$ for WB component and codebook index $i_2$ for SB component are both contained in the second-stage DCI.

In one embodiment, a two-stage (DCI) framework described in each embodiment/example in this disclosure can be signaled via different mediums according to at least one of the following examples: (1) in one example, (Stage 1, Stage 2)=(DCI, DCI); (2) in one example, (Stage 1, Stage 2)=(DCI, PDSCH); (3) in one example, (Stage 1, Stage 2)=(RRC, DCI); (4) in one example, (Stage 1, Stage 2)=(RRC, MAC-CE); and/or (5) in one example, (Stage 1, Stage 2)=(MAC-CE, DCI).

In one embodiment, some parameters conveying hypothesis information for UL precoding can be contained in the first-stage DCI and the hypothesis can be used in the second-stage DCI. In one example, the hypothesis can be codebook subset restriction for $i_2$ or another index.

In one example, a parameter for indicating codebook subset restriction for $i_2$ is indicated in the first-stage DCI. For example, for a rank-1 case, $W_1$ comprises of L=4 DFT beam vectors, which are indicated by $i_1$, and $i_2 \in \{0, 1, 2, \ldots, 15\}$ is used to select one of the beam vectors of $W_1$ and one of the cross-pol phases for each SB, i.e., a four-bit indicator is needed for each SB to represent $i_2$. In this case, in the first-stage DCI, a bit-map indicator with 16-bit for codebook subset restriction for $i_2$ is used to enable or disable codebook index corresponding to each bit index of the bit-map indicator. If the bit-map indicator is indicated to enable four indices among the 16 indices, then a two-bit indicator is needed for each SB to represent $i_2$ in the second-stage DCI signaling.

In one example, codebook subset restrictions for both $i_1$ and $i_2$ are indicated in the first-stage DCI, and $i_1$ and $i_2$ are selected from the restricted codebooks, respectively, in the second-stage DCI. In one example, other parameters such as RI for codebook restriction can be contained in the first-stage DCI.

In one embodiment, some parameters conveying hypothesis information for UL precoding can be signaled via different mediums.

In one example, a RI (restriction) parameter is indicated via RRC, and codebook subset restriction for $i_2$ is indicated via the first-stage DCI, and $i_2$s selected from the restricted subset are indicated via the second-stage DCI.

In one example, a RI (restriction) parameter and codebook subset restriction for $i_1$ are indicated via RRC, and codebook subset restriction for $i_2$ is indicated via the first-stage DCI, and $i_2$ s selected from the restricted subset are indicated via the second-stage DCI.

In one example, a RI (restriction) parameter is indicated via RRC, and codebook subset restriction for $i_1$ is indicated via MAC-CE, and codebook subset restriction for $i_2$ is indicated via the first-stage DCI, and $i_2$ s selected from the restricted subset are indicated via the second-stage DCI.

In one example, a RI (restriction) parameter is indicated via RRC, and codebook subset restrictions for $i_1$ and $i_2$ are indicated via the first-stage DCI, and $i_2$s selected from the restricted subset are indicated via the second-stage DCI.

In one example, codebook subset restriction for $i_1$ is indicated via RRC, a RI (restriction) parameter is indicated via MAC-CE, and codebook subset restriction for $i_2$ is indicated via the first-stage DCI, and $i_2$s selected from the restricted subset are indicated via the second-stage DCI.

In one example, codebook subset restriction for $i_1$ is indicated via RRC, and codebook subset restriction for $i_2$ and a RI (restriction) parameter are indicated via the first-stage DCI, and $i_2$ s selected from the restricted subset are indicated via the second-stage DCI.

In one example, a RI (restriction) parameter is indicated via MAC-CE, and codebook subset restriction for $i_2$ is indicated via the first-stage DCI, and $i_2$s selected from the restricted subset are indicated via the second-stage DCI.

In one example, a RI (restriction) parameter and codebook subset restriction for $i_1$ are indicated via MAC-CE, and codebook subset restriction for $i_2$ is indicated via the first-stage DCI, and $i_2$s selected from the restricted subset are indicated via the second-stage DCI.

In one example, a RI (restriction) parameter is indicated via MAC-CE, and codebook subset restrictions for $i_1$ and $i_2$ are indicated via the first-stage DCI, and $i_2$ s selected from the restricted subset are indicated via the second-stage DCI.

In one example, codebook subset restriction for $i_1$ is indicated via MAC-CE, and codebook subset restriction for $i_2$ and a RI (restriction) parameter are indicated via the first-stage DCI, and $i_2$ s selected from the restricted subset are indicated via the second-stage DCI.

In one example, each of the above examples is taken into account without RI, if RI is fixed (e.g., 1 or 2) when the FS UL precoding is configured. Otherwise, RI can be indicated accordingly.

In one embodiment, TPMI is defined as at least one of the following mapping examples.

In one example, one joint TPMI is used for indicating/signaling ($i_1$, one or multiple $i_2$).

In one example, separate TPMIs are used for indicating/signaling ($i_1$, one or multiple $i_2$), e.g., TPMI=(TPMI1, TPMI2)=($i_1$, one or multiple $i_2$).

In one example, TPMI and new indicator are used for indicating/signaling ($i_1$, one or multiple $i_2$), e.g., (TPMI, new indicator)=($i_1$, one or multiple $i_2$).

In one example, new indicator and TPMI are used for indicating/signaling ($i_1$, one or multiple $i_2$), e.g., (new indicator, TPMI)=($i_1$, one or multiple $i_2$).

In one embodiment, the UL codebook is based on TPMI codebook wherein each TPMI corresponds to a UL precoding matrix. Several examples are shown in the following TABLES 2-1 to 2-7, which are the UL TPMI codebooks up to Rel-16.

TABLE 2-1

Precoding matrix W for single-layer transmission using two antenna ports.

| TPMI index | W (ordered from left to right in increasing order of TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

TABLE 2-2

Precoding matrix W for single-layer transmission using four antenna ports with transform precoding enabled.

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

TABLE 2-3

Precoding matrix W for single-layer transmission using four antenna ports with transform precoding enabled.

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |

TABLE 2-3-continued

Precoding matrix W for single-layer transmission using four antenna ports with transform precoding enabled.

| TPMI index | W (ordered from left to right in increasing order of TPMI index) |
|---|---|
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

TABLE 2-4

Precoding matrix W for two-layer transmission using two antenna ports with transform precoding disabled.

| TPMI index | W (ordered from left to right in increasing order of TPMI index) |
|---|---|
| 0-2 | $\frac{1}{\sqrt{2}}\begin{bmatrix}1&0\\0&1\end{bmatrix}$ $\frac{1}{2}\begin{bmatrix}1&1\\1&-1\end{bmatrix}$ $\frac{1}{2}\begin{bmatrix}1&1\\j&-j\end{bmatrix}$ |

TABLE 2-5

Precoding matrix W for two-layer transmission using four antenna ports with transform precoding enabled.

| TPMI index | W (ordered from left to right in increasing order of TPMI index) |
|---|---|
| 0-3 | $\frac{1}{2}\begin{bmatrix}1&0\\0&1\\0&0\\0&0\end{bmatrix}$ $\frac{1}{2}\begin{bmatrix}1&0\\0&0\\0&1\\0&0\end{bmatrix}$ $\frac{1}{2}\begin{bmatrix}1&0\\0&0\\0&0\\0&1\end{bmatrix}$ $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$ $\frac{1}{2}\begin{bmatrix}0&0\\0&0\\1&0\\0&1\end{bmatrix}$ $\frac{1}{2}\begin{bmatrix}1&0\\0&1\\1&0\\0&-j\end{bmatrix}$ $\frac{1}{2}\begin{bmatrix}1&0\\0&1\\1&0\\0&j\end{bmatrix}$ |

TABLE 2-5-continued

Precoding matrix W for two-layer transmission using four antenna ports with transform precoding enabled.

| TPMI index | W (ordered from left to right in increasing order of TPMI index) |
|---|---|
| 8-11 | $\frac{1}{2}\begin{bmatrix}1&0\\0&1\\-j&0\\0&1\end{bmatrix}$ $\frac{1}{2}\begin{bmatrix}1&0\\0&1\\-j&0\\0&-1\end{bmatrix}$ $\frac{1}{2}\begin{bmatrix}1&0\\0&1\\-1&0\\0&-j\end{bmatrix}$ $\frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}$ $\frac{1}{2}\begin{bmatrix}1&0\\0&1\\j&0\\0&-1\end{bmatrix}$ $\frac{1}{2\sqrt{2}}\begin{bmatrix}1&1\\1&1\\1&-1\\1&-1\end{bmatrix}$ $\frac{1}{2\sqrt{2}}\begin{bmatrix}1&1\\1&1\\j&-j\\j&-j\end{bmatrix}$ |
| 16-19 | $\frac{1}{2\sqrt{2}}\begin{bmatrix}1&1\\j&j\\1&-1\\j&-j\end{bmatrix}$ $\frac{1}{2\sqrt{2}}\begin{bmatrix}1&1\\j&j\\j&-j\\-1&1\end{bmatrix}$ $\frac{1}{2\sqrt{2}}\begin{bmatrix}1&1\\-1&-1\\1&-1\\-1&1\end{bmatrix}$ $\frac{1}{2\sqrt{2}}\begin{bmatrix}1&1\\-1&-1\\j&-j\\-j&j\end{bmatrix}$ |
| 20-21 | $\frac{1}{2\sqrt{2}}\begin{bmatrix}1&1\\-j&-j\\1&-1\\-j&j\end{bmatrix}$ $\frac{1}{2\sqrt{2}}\begin{bmatrix}1&1\\-j&-j\\j&-j\\1&-1\end{bmatrix}$ — — |

TABLE 2-6

Precoding matrix W for three-layer transmission using four antenna ports with transform precoding disabled.

| TPMI index | W (ordered from left to right in increasing order of TPMI index) |
|---|---|
| 0-3 | $\frac{1}{2}\begin{bmatrix}1&0&0\\0&1&0\\0&0&1\\0&0&0\end{bmatrix}$ $\frac{1}{2}\begin{bmatrix}1&0&0\\0&1&0\\1&0&0\\0&0&1\end{bmatrix}$ $\frac{1}{2}\begin{bmatrix}1&0&0\\0&1&0\\-1&0&0\\0&0&1\end{bmatrix}$ $\frac{1}{2\sqrt{3}}\begin{bmatrix}1&1&1\\1&-1&1\\1&1&-1\\1&-1&-1\end{bmatrix}$ |

TABLE 2-6-continued

Precoding matrix W for three-layer transmission using four antenna ports with transform precoding disabled.

| TPMI index | W (ordered from left to right in increasing order of TPMI index) | | | |
|---|---|---|---|---|
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — |

TABLE 2-7

Precoding matrix W for four-layer transmission using four antenna ports with transform precoding disabled.

| TPMI index | W (ordered from left to right in increasing order of TPMI index) | | | |
|---|---|---|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

In one embodiment, the number of TPMIs is the same as the number of SBs, and each TPMI is associated with each SB, and the UL precoding matrix corresponding to each TPMI is applied for the corresponding SB.

When the number of SBs (K) is directly indicated/configured, a UE is configured with UL precoding via two-stage DCI according to at least one of the following examples.

In one example, information $X_1$ in the first stage DCI contains at least the number of SBs K, and information $X_2$ in the second-stage DCI contains K TPMI values for the number of SBs. In this case, since the number of SBs is identified in the first-stage DCI, the number of TPMIs is identified before the second-stage DCI is decoded. Thus, the size of the second-stage DCI can be determined by K, and the UE can decode the second-stage DCI with low complexity (since it can avoid blind decoding).

In one example, information $X_1$ in the first stage DCI does not contain the number of SBs K (e.g., $X_1$ includes configurations only to receive the second-stage DCI such as frequency/time resource allocation, MCS etc.), and information $X_2$ in the second-stage DCI contains both the number of SBs K and K TPMI values for the number of SBs. In this case, the UE may need to perform blind decoding for the second-stage DCI since the UE may not be aware of the size of second-stage DCI.

When the number of SBs (K) is implicitly indicated or can be computed using other parameters, a UE is configured with UL precoding via two-stage DCI according to at least one of the following examples.

In one example, information $X_1$ in the first-stage DCI contains parameters to implicitly compute or indicate the number of SBs K, and information $X_2$ in the second-stage DCI contains K TPMI values for the number of SBs. In this case, since the number of SBs is identified in the first-stage DCI, the number of TPMIs is identified before the second-stage DCI is decoded. Thus, the size of the second-stage DCI can be determined by K, and the UE can decode the second-stage DCI with low complexity (since it can avoid blind decoding).

In one example, information $X_1$ in the first-stage DCI does not contain parameters to implicitly compute or indicate the number of SBs K (e.g., $X_1$ includes configurations only to receive the second-stage DCI such as frequency/time resource allocation, MCS etc.), and information $X_2$ in the second-stage DCI contains parameters to implicitly compute or indicate the number of SBs K and K TPMI values for the number of SBs. In this case, the UE may need to perform blind decoding for the second-stage DCI since the UE may not be aware of the size of second-stage DCI.

Some examples on the parameters to implicitly compute or indicate the number of SBs K are as follows: (1) resource allocation only (when the SB size is fixed); and (2) the SB size and resource allocation information.

In one embodiment, some parameters conveying hypothesis information can be contained in the first-stage DCI and the hypothesis can be used in the second-stage DCI. In one example, the hypothesis can be a TPMI codebook subset restriction. A parameter (for example, "CodebookSubsetRestriction") to define a subset of TPMI codebook can be contained in the first-stage DCI, and TPMI selected from the subset of TPMI codebook, (for each SB) can be contained in the second-stage DCI.

In one example, a bit-map parameter "CodebookSubsetRestriction" to indicate disabled or enabled TPMIs is used to select a subset of TPMI codebook. In one example, "0" indicates the corresponding TPMI to be disabled, and "1" indicates the corresponding TPMI to be enabled. In TABLES 2-8 and 2-9, an example of a codebook subset restriction using a bit-map parameter "CodebookSubsetRestriction," when it is "10011100," is shown:

TABLE 2-8

| | Example of original TPMI codebook | | | | | | | |
|---|---|---|---|---|---|---|---|---|
| | Bit field mapped to index | | | | | | | |
| | 0 | 1 | 2 | 3 | 4 | 5 | 6 | 7 |
| TPMI codebook | TPMI = 0 | TPMI = 1 | TPMI = 2 | TPMI = 3 | TPMI = 4 | TPMI = 5 | TPMI = 6 | TPMI = 7 | when "CodebookSubsetRestriction"="10011100"
⇓

TABLE 2-9

| | Example of the subset of TPMI codebook corresponding to "10011100" | | | |
|---|---|---|---|---|
| | Bit field mapped to index | | | |
| | 0 | 1 | 2 | 3 |
| TPMI codebook | TPMI = 0 | TPMI = 3 | TPMI = 4 | TPMI = 5 |

Therefore, in this case, TPMI (per SB) can be selected from the restricted codebook subset shown in TABLE 2-9 using two-bit indicator and TPMI can be indicated via the second-stage DCI.

In one example, the number of precoding layers (RI) can be contained in the first-stage DCI and this information can be used to determine a TPMI codebook subset from which TPMI is selected and indicated in the second-stage DCI. An example is shown in the following TABLE 2-10 and 2-11.

TABLE 2-10

| | Example of original TPMI codebook (max 4 ranks) | | | | | | | | |
|---|---|---|---|---|---|---|---|---|---|
| | Bit field mapped to index | | | | | | | | |
| | 0 | 1 | ... | 3 | 4 | ... | 9 | 10 | 11 | 12-15 |
| TPMI codebook | 1 layer: TPMI = 0 | 1 layer: TPMI = 1 | ... | 1 layer: TPMI = 3 | 2 layer: TPMI = 0 | | 2 layer: TPMI = 5 | 3 layer: TPMI = 0 | 4 layer: TPMI = 0 | Reserved | when the number of precoding layers (RI)=2
⇓

TABLE 2-11

| | Example of the subset of TPMI codebook corresponding to RI = 2 | | | | | | | |
|---|---|---|---|---|---|---|---|---|
| | Bit field mapped to index | | | | | | | |
| | 0 | 1 | 2 | 3 | 4 | 5 | 6 | 7 |
| TPMI codebook | 2 layer: TPMI = 0 | 2 layer: TPMI = 1 | 2 layer: TPMI = 2 | 2 layer: TPMI = 3 | 2 layer: TPMI = 4 | 2 layer: TPMI = 5 | reserved | reserved |

Therefore, in this case, TPMI (per SB) can be selected from the restricted codebook subset shown in TABLE 2-11 using three-bit indicator and TPMI can be indicated via the second-stage DCI.

For example, both RI and a parameter "CodebookSubsetRestriction" can be contained in the first-stage DCI and used to determine a subset of TPMI codebook, and TPMI is selected from the subset of TPMI codebook and contained in the second-stage DCI. An example for a codebook restriction process is described in the following TABLES 2-12, 2-13, and 2-14.

TABLE 2-12

Example of original TPMI codebook (max 4 ranks)

| | Bit field mapped to index | | | | | | | | |
|---|---|---|---|---|---|---|---|---|---|
| | 0 | 1 | ... | 3 | 4 | ... | 9 | 10 | 11 | 12-15 |
| TPMI codebook | 1 layer: TPMI = 0 | 1 layer: TPMI = 1 | ... | 1 layer: TPMI = 3 | 2 layer: TPMI = 0 | ... | 2 layer: TPMI = 5 | 3 layer: TPMI = 0 | 4 layer: TPMI = 0 | Reserved | when the number of precoding layers (RI)=1
⇓

TABLE 2-13

Example of the subset of TPMI codebook corresponding to RI = 1

| | Bit field mapped to index | | | |
|---|---|---|---|---|
| | 0 | 1 | 2 | 3 |
| TPMI codebook | 1 layer: TPMI = 0 | 1 layer: TPMI = 1 | 1 layer: TPMI = 2 | 1 layer: TPMI = 3 | when "CodebookSubsetRestriction"="1001"
⇓

TABLE 2-14

Example of the subset of TPMI codebook corresponding to "1001"

| | Bit field mapped to index | |
|---|---|---|
| | 0 | 1 |
| TPMI codebook | 1 layer: TPMI = 0 | 1 layer: TPMI = 3 |

Therefore, in this case, TPMI (per SB) can be selected from the restricted codebook subset shown in TABLE 2-14 using one-bit indicator and TPMI can be indicated via the second-stage DCI.

In one embodiment, some parameters conveying hypothesis information for UL precoding can be signaled via different mediums.

In one example, a RI (restriction) parameter is indicated via RRC, and TPMI subset restriction is indicated via the first-stage DCI, and SB TPMIs from the restricted TPMI subset are indicated via the second-stage DCI.

In one example, a RI (restriction) parameter is indicated via MAC-CE, and TPMI subset restriction is indicated via the first-stage DCI, and SB TPMIs from the restricted TPMI subset are indicated via the second-stage DCI.

In one example, TPMI subset restriction is indicated via RRC, and a RI (restriction) parameter is indicated via the first-stage DCI, and SB TPMIs from the restricted TPMI subset are indicated via the second-stage DCI.

In one example, TPMI subset restriction is indicated via MAC-CE, and a RI (restriction) parameter is indicated via the first-stage DCI, and SB TPMIs from the restricted TPMI subset are indicated via the second-stage DCI.

In one example, each of the above examples is taken into account without RI, if RI is fixed (e.g., 1 or 2) when the FS UL precoding is configured. Otherwise, RI can be indicated accordingly.

In one embodiment, the number of TPMIs is not necessarily equal to the number of SBs (K).

In one embodiment, the number of TPMIs is pre-determined or fixed to 2 for frequency-selective UL precoding.

In one example, the first TPMI is used for the first half of allocated RBs and the second TPMI is used for the other half of allocated RBs. The TPMI indication can be signaled via the second-stage DCI.

In one example, the first TPMI is used for $K_1$ SBs and the second TPMI is used for the remaining $K-K_1$ SBs, where $K_1 \leq K$. $K_1$ can be determined according to one of the following examples.

In one example, $K_1$ is fixed. For example, $K_1$ is defined as $$\left\lceil \frac{K}{2} \right\rceil \text{ or } \left\lceil \frac{K}{3} \right\rceil.$$

In one example, $K_1$ is configured by NW via RRC, MAC-CE, or DCI (first- or second-). For example, a ratio of $K_1$ to K is selected from a set, $$\text{e.g., } \left\{ \frac{1}{6}, \frac{1}{4}, \frac{1}{3}, \frac{1}{2} \right\}$$

In one example, $K_1$ is selected from 1 to $$\left\lceil \frac{K}{2} \right\rceil.$$

In one example, an indicator to indicate the locations of $K_1$ SBs among the K SBs is defined. For example, a $$\log_2 \binom{K}{K_1} \text{-bit}$$

indicator can be used to indicate the indices of $K_1$ SBs among the K SBs.

In one example, any combination of $K_1$, an indicator for indicating locations of $K_1$ SBs, and TPMI is contained in the first-stage DCI, and any combination of the remaining information is contained in the second-stage DCI. In one example, $K_1$ and an indicator for indicating locations of $K_1$ SBs are contained in the first-stage DCI, and the TPMI information is contained in the second-stage DCI. In one example, $K_1$ is contained in the first-stage DCI, and an indicator for indicating locations of $K_1$ and the TPMI information are contained in the second-stage DCI.

In one embodiment, the number of TPMIs (T) is pre-determined or fixed to T>2 for frequency-selective UL precoding.

In one example, the t-th TPMI is used for the t-th part of allocated RBs, where allocated RBs are partitioned into T parts in a pre-determined way. In one example, the partitioning is evenly done. The TPMI indication can be signaled via the second-stage DCI.

In one example, the t-th TPMI is used for $K_t$ SBs for t=1, ···, T−1, and the last TPMI is used for the remaining $K-\Sigma_{t=1}^{T-1} K_t$ SBs, where $K_t \leq K-\Sigma_{s=1}^{t-1} K_s$. $\{K_t\}$ can be determined according to one of the following examples.

In one example, $\{K_t\}$ are fixed. For example, $K_t$ is defined as $$\left\lceil \frac{K}{T+1} \right\rceil \text{ or } \left\lfloor \frac{K}{T} \right\rfloor.$$

In one example, $\{K_t\}$ are configured by NW via RRC, MAC-CE, or DCI (first- or second-stage DCI). For example, a ratio of $K_t$ to $K-\Sigma_{s=1}^{t-1} K_s$ is selected from a set, $$\text{e.g., } \left\{\frac{1}{6}, \frac{1}{4}, \frac{1}{3}, \frac{1}{2}\right\}.$$

In one example, $K_1$ is selected from 1 to $$\left\lceil \frac{K}{2} \right\rceil,$$

$K_2$ is selected from 1 to $$\left\lceil \frac{K-K_1}{2} \right\rceil,$$

$K_3$ is selected from 1 to $$\left\lceil \frac{K-(K_1+K_2)}{2} \right\rceil,$$

and so on.

In one example, an indicator to indicate the locations of $K_t$ SBs among the $K-\Sigma_{s=1}^{t-1} K_s$ SBs is defined. For example, a $$\log_2\left(\frac{K-\Sigma_{k=1}^{t-1} K_s}{K_t}\right)\text{-bit}$$

indicator can be used to indicate the indices of $K_t$ SBs among the $K-\Sigma_{s=1}^{t-1} K_s$ SBs.

In one example, any combination of $\{K_t\}$, indicators for indicating locations of $\{K_t\}$ SBs, and TPMI is contained in the first-stage DCI, and any combination of the remaining information is contained in the second-stage DCI.

In one example, $\{K_t\}$ and indicators for indicating locations of $\{K_t\}$ SBs are contained in the first-stage DCI, and the TPMI information is contained in the second-stage DCI.

In one example, $\{K_t\}$ is contained in the first-stage DCI, and an indicator for indicating locations of $\{K_t\}$ and the TPMI information are contained in the second-stage DCI.

In one embodiment, the number of TPMIs (T) for frequency selective UL precoding is configured by NW via RRC, MAC-CE, or DCI (first- or second-stage DCI).

In one embodiment, the number of TPMIs (T) for frequency selective UL precoding is determined by other configured parameters.

In one example, the number of TPMIs is a multiple of the number of SBs. In one example, the number of TPMIs is the floor or the ceil of a fraction of the number of SBs. In one example, the number of TPMIs depends on the number of allocated RBs or bandwidth part size. An example is shown in TABLE 3.

TABLE 3

| Bandwidth part size and the number of TPMIs | |
|---|---|
| Bandwidth part size | The number of TPMIs |
| 1-36 | 1, 2, 4, 8 |
| 37-72 | 4, 8, 12, 16 |
| 73-144 | 8, 16, 24, 32 |
| 145-275 | 16, 32, 48, 64 |

In one embodiment, some parameters conveying hypothesis information can be contained in the first-stage DCI and the hypothesis can be used in the second-stage DCI. In one example, the hypothesis can be a TPMI codebook subset restriction. A parameter (for example, "CodebookSubsetRestriction") to define a subset of TPMI codebook can be contained in the first-stage DCI, and TPMI selected from the subset of TPMI codebook, can be contained in the second-stage DCI. In various embodiments, codebook subset restriction can be performed in this embodiment.

In one embodiment, some parameters conveying hypothesis information for UL precoding can be signaled via different mediums. Different mediums can be used to indicate hypothesis for UL precoding.

In one embodiment, a differential scheme is applied to indicate TPMIs for frequency-selective UL precoding. The differential indication mode can be "on" or "off" using a parameter, (for example, it may be referred as "TPMIDifferentialIndicationEnabled"), via high-layer signaling, MAC-CE or DCI.

In one example, TPMI is indicated only when the TPMI is changed from the previous TPMI.

In one example, a bit-map indicator with T−1 bits (or T bits if naively defined) is used to indicate which TPMI has the same as the previous TPMI. In this case, the first TPMI may be indicated and then based on it, the bit-map indicator with K−1 bits is used to indicate which TPMI becomes different from the previous TPMI. In one example, "0" indicates that the corresponding TPMI has the same value as the previous TPMI, whereas "1" indicates that the corresponding TPMI has a different value from the previous TPMI. Thus, in this case, it is enough to indicate TPMIs corresponding to "1s" indicated in the bit-map indicator.

In one example, the bit-map indicator for the differential scheme is indicated via the first-stage DCI (i.e., contained in $X_1$), and TPMIs corresponding to "1s" indicated in the bit-map indicator are indicated via the second-stage DCI (i.e., contained in $X_2$). In this example, "TPMIDifferentialIndicationEnabled" can be also signaled via either RRC, MAC-CE, or DCI, (e.g., the first-stage DCI).

In one example, the bit-map indicator for the differential scheme and TPMIs corresponding to "1s" indicated in the bit-map indicator are indicated via the second-stage DCI (i.e., contained in $X_2$). In this example, "TPMIDifferentialIndicationEnabled" can be also signaled via either RRC, MAC-CE, or DCI, (e.g., the first-stage DCI or second-stage DCI).

In one example, an indicator $\overline{H_1}$ is used to indicate locations of TPMIs that change from the respective previous TPMIs among the T TPMIs and an indicator $\widetilde{H_2}$ is used to indicate the number of the corresponding TPMIs $\check{D}(\leq T_{th})$, where $T_{th} \leq T$ is the maximum number of TPMIs that change from the respective previous TPMIs. In this case, the amount of required bits for indicator $\widetilde{H_1}$ is $$\left\lceil \log_2 \binom{T-1}{\check{D}} \right\rceil \text{ bits,}$$

and the amount of required bits for indicator $\widetilde{H_2}$ is $\lceil \log_2 T_{th} \rceil$ bits. In one example, $$T_{th} = \left\lceil \frac{T}{3} \right\rceil \text{ or } \left\lceil \frac{T}{4} \right\rceil.$$

In one example, the ratio of $$\frac{T_{th}}{T}$$

is fixed or pre-determined. In another example, the ratio of $$\frac{T_{th}}{T}$$

can be configured via RRC, MAC-CE, or DCI signaling. In this example, the $\check{D}$ TPMIs corresponding to the indicated in $\widetilde{H_1}$ and the first TPMI are signaled to the UE.

In one example, indicators $\widetilde{H_1}$ and $\widetilde{H_2}$ are signaled via the first-stage DCI (i.e., contained in $X_1$) and TPMI information is signaled via the second-stage DCI (i.e., contained in $X_2$).

In one example, indicator $\widetilde{H_2}$ is signaled via the first stage DCI (i.e., contained in $X_1$) and indicator $\widetilde{H_1}$ and TPMI information are signaled via the second-stage DCI (i.e., contained in $X_2$).

In one example, indicator $\widetilde{H_1}$ is signaled via the first stage DCI (i.e., contained in $X_1$) and indicator $\widetilde{H_2}$ and TPMI information are signaled via the second-stage DCI (i.e., contained in $X_2$).

In one example, indicators $\widetilde{H_1}$ and $\widetilde{H_2}$ and TPMI information are signaled via the second-stage DCI (i.e., contained in $X_2$).

In one example, "TPMIDifferentialIndicationEnabled" can be also signaled via either RRC, MAC-CE, or DCI, (e.g., the first-stage DCI or the second-stage DCI).

For a UE capability that affects TPMI codebook restriction such as "non-coherent," "partial-coherent," and "fully-coherent" on antenna ports at the UE, an initial TPMI codebook can be determined based on the confined TPMI codebook based on the UE capability (similar to TPMI tables shown in 3GPP standard specification). Once the initial TPMI codebook is determined, further codebook restriction or confinement can be performed, for example, according to the examples/embodiments described under embodiment 2.

Figure 8:
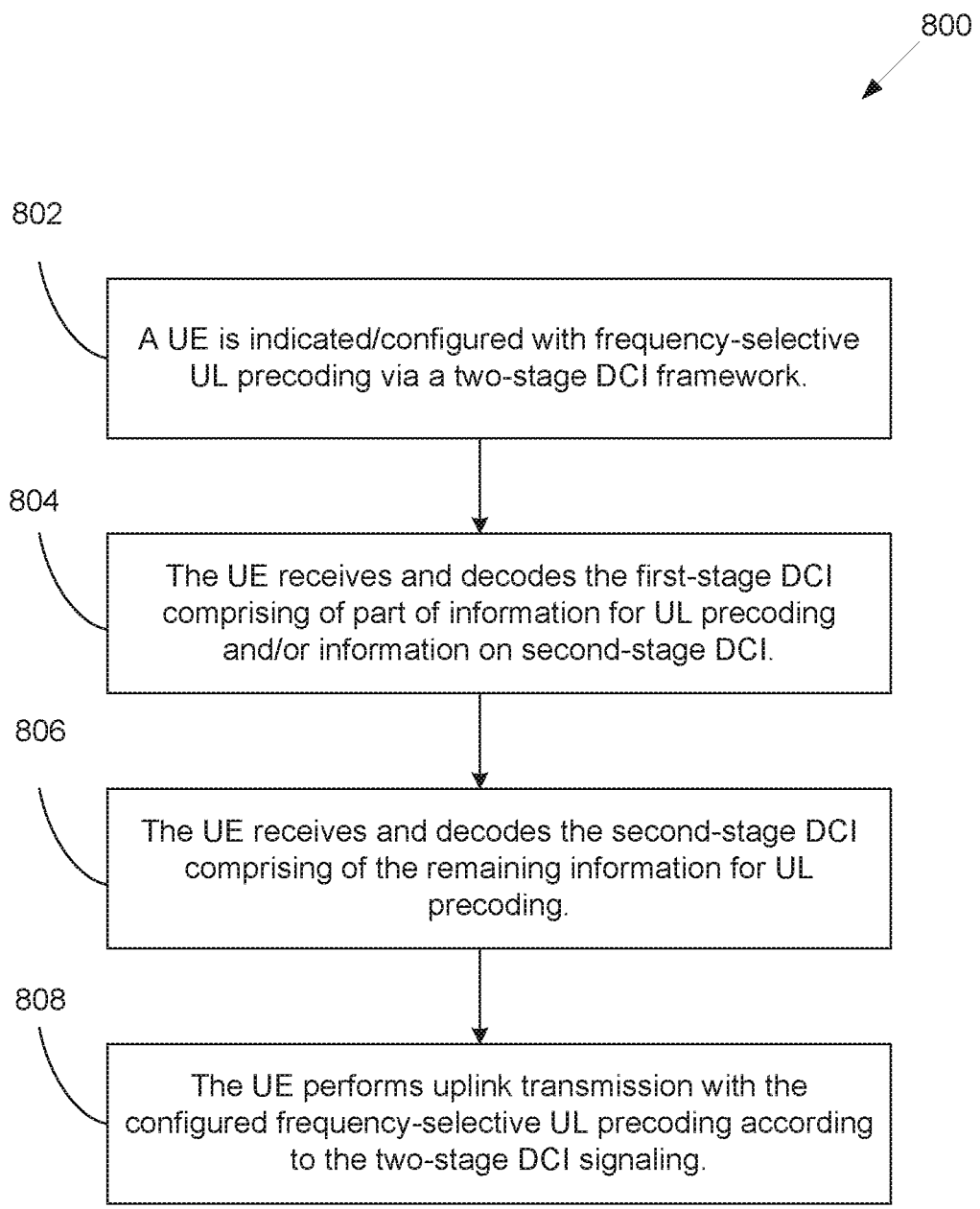
FIG. 8 illustrates a flowchart of method for UE according to embodiments of the present disclosure.

FIG. 8 illustrates a flowchart of method 800 for UE according to embodiments of the present disclosure. The method 800 as may be performed by a UE (e.g., 111-116 as illustrated in FIG. 1). An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

FIG. 8 shows a representative flow chart of UE operations receiving two-stage DCI for configuring frequency-selective UL precoding and performing UL transmission according to the configuration.

As shown in FIG. 8, in step 802, a UE is indicated/configured with frequency-selective UL precoding via a two-stage DCI framework. Subsequently, in step 804, the UE receives and decodes the first-stage DCI comprising of part of information for UL precoding and/or information on second-stage DCI. Next, in step 806, the UE receives and decodes the second-stage DCI comprising of the remaining information for UL precoding. Finally, in step 808, the UE performs UL transmission with the configured frequency-selective UL precoding according to the two-stage DCI signaling. For example, in various embodiments the UL transmission can be an UL signal for any type of UL communication including, for example, an UL channel, such as a PUSCH or PUCCH, a UL RS, such as SRS, for example, UCI, such as HARK-ACK information, UL data, etc.

Any of the above variation embodiments/examples can be utilized independently or in combination with at least one other variation embodiment/examples.

In one embodiment 1A, the UL codebook is based on a dual-stage-based linear combination codebook $W=W_1W_2$ (for each layer), where $W_1$ comprises of spatial domain (SD) basis vectors and $W_2$ comprises of linear combination coefficients for each SB (or other granularity).

In one example, the dual-stage-based linear combination codebook is based on DL (Rel-15) Type-II CSI codebook as described in 3GPP standard specification. Let $i_1$ and $i_2$ be codebook indices for WB component codebook $W_1$ and SB component codebook $W_2$, respectively.

The key components of DL Type-II CSI codebook are as follows: (1) oversampled DFT basis indicator (layer common, polarization common), $i_{1,1}$; (2) DFT beam selection indicator (layer common, polarization common), $i_{1,2}$; (3) WB strongest coefficient indicator (per layer), $i_{1,3}$; (4) WB amplitude coefficient indicator (per layer), $i_{1,4}$; (5) SB phase coefficient indicator (per layer), $i_{2,1}$; and (6) SB amplitude coefficient indicator (per layer), $i_{2,2}$.

One example of dual-stage codebook for the UL codebook is DL Type-I CSI codebook as described in 3GPP standard specification. For example, L (1D or 2D) DFT beam vectors are selected to construct the WB component $W_1$. For example, L can be 1 or 4. In one example, for each SB, co-phase and beam/pre-coder selection component $W_2$ can be constructed according to (or similar to) DL Type-I CSI codebook as described in 3GPP standard specification.

In one embodiment, information $X_1$ in the first-stage DCI contains part of information for UL precoding and information $X_2$ in the second-stage DCI contains the remaining of information for UL precoding.

In one example, information on WB component $W_1$ for UL precoding is contained in $X_1$ and information on SB component for UL precoding is contained in $X_2$.

In one example, an SD basis selection indicator, an SD beam selection indicator, a strongest coefficient indicator, and WB amplitude coefficients are contained in $X_1$ and SB phase and amplitude coefficients are contained in $X_2$.

In one example, information on WB component $W_1$ for UL precoding and on part of SB component $W_2$ is contained in $X_1$ and information on the remaining SB component for UL precoding is contained in $X_2$.

In one example, SD basis selection, SD beam selection, strongest coefficient indicator, WB amplitude coefficients, and SB amplitude coefficients are contained in $X_1$ and SB phase coefficients are contained in $X_2$.

In another example, any combination of the above indicators is contained $X_1$ and the remaining indicators are contained in $X_2$.

In one embodiment, information $X_1$ in the first-stage DCI contains part of information for UL precoding and information (I) about some or all of the remaining information for UL precoding, and information $X_2$ in the second-stage DCI contains the remaining information for UL precoding (which is designed based on the information I included in the first stage).

In one example, information $X_1$ contains information on WB component $W_1$ and information $X_2$ contains information on SB component $W_2$.

In one example, information (I) on codebook subset restriction for SB component $W_2$ is contained in $X_1$ and information for SB component $W_2$ which is indicated under the codebook subset restriction in I is contained in $X_2$.

In one example, information (I) on SB amplitude restriction and/or SB phase restriction is contained in $X_1$ and SB amplitudes and/or phases are selected and indicated under the SB amplitude and/or phase restrictions, and the information on SB amplitudes and/or phases is contained in $X_2$.

For example, a bit parameter for SB amplitude restriction is contained in I, and the parameter is "0" then the restriction is on, and all SB amplitudes are regarded as one and thus not contained in $X_2$. On the other hands, if the parameter is "1," SB amplitudes are indicated, and the information is contained in $X_2$.

For example, a bit parameter for SB phase restriction is contained in I, and the parameter is "0" then the restriction is on, and all SB phases are selected from a 2-bit PSK codebook, and the information is contained in $X_2$. On the other hands, if the parameter is "1," all SB phases are selected from a 3-bit PSK codebook, and the information is contained in $X_2$.

In one embodiment, information $X_1$ in the first-stage DCI contains configuration/information about the UL codebook and information $X_2$ in the second-stage DCI contains all information for UL precoding based on the configured information in the first stage DCI.

In one example, SB UL precoding mode or WB UL precoding mode is indicated via $X_1$. Based on the indication in $X_1$, information for UL precoding is determined and indicated via $X_2$.

In one embodiment, the UL codebook is based on a triple-stage-based linear combination codebook $W=W_1 W_2 W_f^H$ (for each layer), where $W_1$ and $W_f$ comprises of SD basis vectors and frequency domain (FD) basis vectors, respectively, and $W_2$ comprises of coefficients corresponding to SD and FD basis vector pairs.

In one example, the triple-stage-based linear combination codebook is based on DL (Rel-16) enhanced Type-II (eType-II) CSI codebook as described in 3GPP standard specification.

The key components of DL eType-II CSI codebook are as follows: (1) oversampled SD DFT basis indicator (layer common, polarization common), $i_{1,1}$; (2) SD DFT beam selection indicator (layer common, polarization common), $i_{1,2}$; (3) FD beam selection indicator (layer specific), $i_{1,6}$; (4) bitmap indicator for indicating non-zero coefficients (layer specific), $i_{1,7}$; (5) strongest coefficient indicator (layer specific), $i_{1,8}$; (6) reference amplitude coefficient indicator (per layer, polarization common), $i_{2,3}$; (7) amplitude coefficient indicator (per layer, polarization specific), $i_{2,4}$; and/or (8) phase coefficient indicator (per layer, polarization specific), $i_{2,5}$.

In one embodiment, information $X_1$ in the first-stage DCI contains part of information for UL precoding and information $X_2$ in the second-stage DCI contains the remaining of information for UL precoding.

In one example, an SD basis selection indicator, an SD beam selection indicator, an FD beam selection indicator, and a bitmap indicator for indicating non-zero coefficients are contained in $X_1$ and reference amplitude coefficient indicator, amplitude coefficient indicator, and phase coefficient indicator are contained in $X_2$.

In one example, any combination of the above indicators is contained $X_1$ and the remaining indicators are contained in $X_2$.

In one embodiment, information $X_1$ in the first-stage DCI contains part of information for UL precoding and information (I) about some or all of the remaining information for UL precoding, and information $X_2$ in the second-stage DCI contains the remaining information for UL precoding (which is designed based on the information I included in the first stage).

In one example, information (I) on codebook subset restriction for coefficient component ($W_2$) is contained in $X_1$ and information for the coefficient component ($W_2$) which is indicated under the codebook subset restriction in I is contained in $X_2$.

In one example, information (I) on amplitude restriction and/or phase restriction is contained in $X_1$ and amplitudes and/or phases are selected and indicated under the amplitude and/or phase restrictions, and the information on amplitudes and/or phases is contained in $X_2$.

For example, a bit parameter for phase restriction is contained in I, and the parameter is "0" then the restriction is on, and all SB phases are selected from a 2-bit PSK codebook, and the information is contained in $X_2$. On the other hands, if the parameter is "1," all SB phases are selected from a 3-bit PSK codebook, and the information is contained in $X_2$.

In one embodiment, information $X_1$ in the first-stage DCI contains configuration/information about the UL codebook and information $X_2$ in the second-stage DCI contains all information for UL precoding based on the configured information in the first stage DCI.

In one example, information such as parameters indicating a number of SD beams, a ratio of the number of non-zero coefficients in $W_2$, a ratio of the number of FD beams to the number of SBs are contained in $X_1$. Based on the indication in $X_1$, information for UL precoding is determined and indicated via $X_2$.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive, via a two-stage downlink control information (DCI) framework, configuration information for transmission of an uplink (UL) signal, the configuration information including allocated resources for transmission of the UL signal and UL precoding information; and
a processor operably coupled to the transceiver, the processor configured to, based on the UL precoding information, apply UL precoding for the transmission of the UL signal, wherein:
a two-stage DCI framework includes a first-stage DCI $X_1$ and a second-stage DCI $X_2$,
the first-stage DCI $X_1$ includes at least one of first information associated with the second-stage DCI and a first part of the configuration information,
the second-stage DCI $X_2$ includes at least one of second information based on the first information and a second part of the configuration information,
$X_1$ includes a first indicator to indicate a subset of a transmit precoding matrix index (TPMI) codebook,
$X_2$ includes a TPMI selected from the subset of TPMI codebook for each sub-band (SB), and
the transceiver is further configured to transmit a precoded UL signal on the allocated resources according to the configuration information.

2. The UE of claim 1, wherein:
$X_1$ includes a wide-band (WB) component and a first subset of a sub-band (SB) component, and
$X_2$ includes a second subset of the SB component.

3. The UE of claim 2, wherein:
the first subset of the SB component is for $K_1$ SBs, and
the second subset of the SB component is for $K-K_1$ SBs, where K is a number of configured SBs.

4. The UE of claim 3, wherein $K_1$ is one of:
predetermined,
configured via radio resource control (RRC) signaling, a medium access control-control element (MAC-CE), or DCI, or
included in the first-stage DCI $X_1$ of the two-stage DCI framework.

5. The UE of claim 1, wherein:
$X_1$ includes a wide-band (WB) component and an indicator to enable or disable a sub-band (SB) component indication in a differential manner, and
$X_2$ includes a SB component based on the indicator.

6. The UE of claim 5, wherein:
$X_1$ includes an indicator for a bitmap to indicate a second SB that has a SB component that is different from a SB component of a first SB, and
$X_2$ includes the SB component for the second SB indicated by the bitmap.

7. The UE of claim 1, wherein:
$X_1$ includes a second indicator to indicate locations of $K_1$ sub-bands (SBs) among K SBs, and
the TPMI selected from the subset of the TPMI codebook is selected for each of the $K_1$ SBs.

8. A base station (BS) comprising:
a transceiver configured to:
transmit, via a two-stage downlink control information (DCI) framework, configuration information for transmission of an uplink (UL) signal, the configuration information including allocated resources for transmission of the UL signal and UL precoding information; and
receive the UL signal, precoded based on the UL precoding information, on the allocated resources according to the configuration information, wherein:
a two-stage DCI framework includes a first-stage DCI $X_1$ and a second-stage DCI $X_2$,
the first-stage DCI $X_1$ includes at least one of first information associated with the second-stage DCI and a first part of the configuration information,
the second-stage DCI $X_2$ includes at least one of second information based on the first information and a second part of the configuration information,
$X_1$ includes an indicator to indicate a subset of a transmit precoding matrix index (TPMI) codebook, and
$X_2$ includes a TPMI selected from the subset of TPMI codebook for each sub-band (SB).

9. The BS of claim 8, wherein:
$X_1$ includes a wide-band (WB) component and a first subset of a sub-band (SB) component, and
$X_2$ includes a second subset of the SB component.

10. The BS of claim 9, wherein:
the first subset of the SB component is for $K_1$ SBs, and
the second subset of the SB component is for $K-K_1$ SBs, where K is a number of configured SBs.

11. The BS of claim 10, wherein $K_1$ is one of:
predetermined,
configured via radio resource control (RRC) signaling, a medium access control-control element (MAC-CE), or DCI, or
included in the first-stage DCI $X_1$ of the two-stage DCI framework.

12. The BS of claim 8, wherein:
$X_1$ includes a wide-band (WB) component and an indicator to enable or disable a sub-band (SB) component indication in a differential manner, and
$X_2$ includes a SB component based on the indicator.

13. The BS of claim 12, wherein:
$X_1$ includes an indicator for a bitmap to indicate a second SB that has a SB component that is different from a SB component of a first SB, and
$X_2$ includes the SB component for the second SB indicated by the bitmap.

14. A method for operating a user equipment (UE), the method comprising:
receiving, via a two-stage downlink control information (DCI) framework, configuration information for transmission of an uplink (UL) signal, the configuration information including allocated resources for transmission of the UL signal and UL precoding information; and
applying, based on the UL precoding information, UL precoding for the transmission of the UL signal, wherein:

a two-stage DCI framework includes a first-stage DCI $X_1$ and a second-stage DCI $X_2$, the first-stage DCI $X_1$ includes at least one of first information associated with the second-stage DCI and a first part of the configuration information, the second-stage DCI $X_2$ includes at least one of second information based on the first information and a second part of the configuration information, $X_1$ includes an indicator to indicate a subset of a transmit precoding matrix index (TPMI) codebook, and $X_2$ includes a TPMI selected from the subset of TPMI codebook for each sub-band (SB); and transmitting a precoded UL signal on the allocated resources according to the configuration information.

15. The method of claim 14, wherein:

$X_1$ includes a wide-band (WB) component and a first subset of a sub-band (SB) component, and $X_2$ includes a second subset of the SB component.

16. The method of claim 15, wherein:

the first subset of the SB component is for $K_1$ SBs, and the second subset of the SB component is for $K-K_1$ SBs, where K is a number of configured SBs.

17. The method of claim 16, wherein $K_1$ is one of:

predetermined, configured via radio resource control (RRC) signaling, a medium access control-control element (MAC-CE), or DCI, or included in the first-stage DCI $X_1$ of the two-stage DCI framework.

18. The method of claim 14, wherein:

$X_1$ includes a wide-band (WB) component and an indicator to enable or disable a sub-band (SB) component indication in a differential manner, and $X_2$ includes a SB component based on the indicator.

19. The method of claim 18, wherein:

$X_1$ includes an indicator for a bitmap to indicate a second SB that has a SB component that is different from a SB component of a first SB, and $X_2$ includes the SB component for the second SB indicated by the bitmap.

* * * * *